United States Patent [19]
Parry et al.

[11] Patent Number: 6,077,085
[45] Date of Patent: Jun. 20, 2000

[54] TECHNOLOGY ASSISTED LEARNING

[75] Inventors: Kent Parry, Orem; C. Bret Elzinga, American Fork, both of Utah

[73] Assignee: Intellectual Reserve, Inc., Salt Lake City, Utah

[21] Appl. No.: 09/081,706

[22] Filed: May 19, 1998

[51] Int. Cl.⁷ .................................................. G09B 3/00
[52] U.S. Cl. ........................ 434/322; 434/185; 434/118
[58] Field of Search ................................. 434/322, 323, 434/118, 156, 157, 185, 186, 350, 362

[56] References Cited

U.S. PATENT DOCUMENTS

| | | | |
|---|---|---|---|
| 4,637,797 | 1/1987 | Whitney et al. | 434/118 |
| 5,302,132 | 4/1994 | Corder | 434/156 |
| 5,306,154 | 4/1994 | Ujita et al. | 434/218 |
| 5,316,485 | 5/1994 | Hirose | 434/322 |
| 5,318,450 | 6/1994 | Carver | 434/350 |
| 5,387,104 | 2/1995 | Corder | 434/156 |
| 5,395,243 | 3/1995 | Lubin et al. | 434/118 |
| 5,441,415 | 8/1995 | Lee et al. | 434/350 |
| 5,442,782 | 8/1995 | Malatesta et al. | 395/600 |
| 5,486,111 | 1/1996 | Watkins | 434/157 |
| 5,503,560 | 4/1996 | Stentiford | 434/167 |
| 5,597,312 | 1/1997 | Bloom et al. | 434/362 |
| 5,788,508 | 8/1998 | Lee et al. | 434/118 |
| 5,797,754 | 8/1998 | Griswold et al. | 434/322 |
| 5,957,669 | 9/1999 | Peterson et al. | 434/118 |

*Primary Examiner*—Valencia Martin-Wallace
*Assistant Examiner*—Sheila Clayton
*Attorney, Agent, or Firm*—Kirton & McConkie

[57] ABSTRACT

The systems, methods and apparatus of preferred embodiments of the present invention provide an integrated instructional system directed to learning a specific task or concept. Some embodiments are particularly suited for language instruction and some embodiments will accommodate a group of students with differing native languages. This is accomplished in the exemplary embodiment through the use of a template and database system wherein computer activity templates are programmed to perform a task or carry out an exercise. An activity template accesses data stored in a multilingual language database according to a student's needs or preferences. Embodiments of the present invention also provide a review method and system which optimize study efficiency by managing the content of review sessions according to each student's individual familiarity with those concepts. A systematic spaced review method gauges a student's long-term retention, understanding and familiarity with a concept by measuring, recording and monitoring the student's speed and accuracy of response to a prompt. Some embodiments also provide a concept tagging method and system whereby a database of words, phrases, sentences and other similar language constructs is analyzed to identify specific grammar, syntax, vocabulary or other language structure or concepts. Database elements are tagged according to these constructs for sorting and filtering according to a students needs. The systems and methods of the present invention will also relieve the instructor of the responsibilities of monitoring student progress, tailoring materials to individual students and their varying levels of progress, developing testing materials to gauge progress and proficiency, and developing study aids to help students master particular challenges. The system and method also benefits students generally by providing systems and methods which allow students to study at their own pace on an individual basis thereby providing an optimum level of challenge for all students.

42 Claims, 15 Drawing Sheets

| Question | Working Group Items | Review Pool Items To Draw From | Student Response | Resulting Program Action |
|---|---|---|---|---|
| (fill pool) | | ABCDEF GHIJKLM | | |
| 1 | ACB | DEFGHIJ KLM | Incorrect response to item A. | |
| 2 | ACB | DEFGHIJ KLM | Fast, correct response to item C. | Item C leaves working group, and advances 3 review pools |
| 3 | ADB | EFGHIJK LM | Incorrect response to item B. | |
| (shuffle) | | EFGHIJK LM | | |
| 4 | BDA | EFGHIJK LM | Incorrect response to item B. | |
| 5 | BDA | EFGHIJK LM | Correct and slow response to D. | |
| 6 | BDA | EFGHIJK LM | Correct and slow response to A. | |
| (shuffle) | | EFGHIJK LM | | |
| 7 | DBA | EFGHIJK LM | Second correct and slow response to D. | Item D leaves working group, and progresses to the review pools. |
| 8 | EBA | FGHIJKL M | Third incorrect response to B. | Item B leaves working group, and regresses to the previous review pool. |
| 9 | EFA | GHIJKLM | Second correct and slow response to A. | Item A leaves working group, and progresses to the next review pool. |

FIG. 10

TECHNOLOGY ASSISTED LEARNING

BACKGROUND OF THE INVENTION

1. The Field of the Invention

This invention relates generally to the use of an educational, training, teaching or learning method and system, the elements of which may be implemented by way of computer or other conventional apparatus for use by individual or multiple student groups. The method and system may be used for instruction in any number of subjects, but is particularly suited to language training. The system employs multimedia computer technology as well as more conventional teaching and study aids.

2. The Relevant Technology

Instructional and teaching systems have been in existence for centuries, but their development has increased markedly during the "computer age" with the advent of multimedia technology and its many benefits. The overcrowding of schools, the increased knowledge expectation from students, and more hurried schedules increase the demand for an efficient teaching or learning system. In this environment, an efficient learning system, such as the present invention, permits an individual student to learn at her own pace, rather than that of the group, providing an instructor with the opportunity to spend more time working on students' particular needs, manage larger classes, or work with multiple classrooms thereby increasing efficiency and productivity.

In the current technology, computers have been implemented in the learning process in many ways. Systems which present a series of static lessons separated by a prompt-response testing procedure which determines whether the student will be allowed to progress to the next lesson or return to additional instruction on the tested subject in another format are known. These methods monitor student progress and disseminate additional information as the student progresses.

Also known are learning systems with material indexed by type, item and importance factor which selects an appropriate lesson according to user input and edits out parts of the lesson which are considered to be below the student's comprehension level.

Other learning systems employ computer technology, but are limited in scope to particular fields of instruction, such as instruction in the use of computer programs or limited in format to specific media, such as text and simulation exercises. Still other methods use lessons or objectives arranged in a predefined hierarchy. Other prior art references focus on monitoring and evaluation of the student rather than on instruction.

The majority of learning systems in the prior art utilize a static lesson format which is typically arranged in a predefined order. This format ignores the individual needs of each student and forces the student to conform to a static method which may not fit her specific needs. What is needed is a lesson format which dynamically adapts to the student's strengths and weaknesses using a system which gives the student more time to study the particular items which challenge her optimally and by providing a system which is not restricted by static lesson blocks.

The prior art also lacks a system or method for ensuring that learned information is stored in the student's mid or long term memory What is needed are systems and methods for review which ensure that the information is retained beyond short term memory so the student is more likely to retain the information for long periods of time.

Prior art references also lack the ability to allow the student to choose from optional study programs while providing a method for ensuring that each item is studied for a proper amount of time in an efficient sequence. What is needed are systems and methods which permit the student to specify activity sequencing.

While it is known to edit portions of lessons which the student has already mastered, no existing system ensures that the student is consistently and properly challenged using methods to filter learning content based on changing levels of complexity.

Also unknown in the prior art but needed is a method which allows the instructor to efficiently prepare a database so that it can be tagged and filtered for use according to specific conceptual content.

Also needed are systems and methods which allows the system to be used to simultaneously teach multiple languages to students with differing native languages. Such a system would allow one system to be used universally in many countries to learn multiple languages or other disciplines and allows the same system to be used to teach languages in both directions (i.e., Japanese to English and English to Japanese) simply by selecting the proper native and target languages. When configured with the proper databases such a system could conceivably be used to teach any language to any student.

Existing systems also lack effective memorization methods. What is needed are additional systems and methods which enhance memorization activities through hint and prompt techniques.

SUMMARY AND OBJECTS OF THE INVENTION

The objects and advantages of the present invention are to provide an integrated instructional system containing print materials, practice activities, and computer activities all linked and directed to learning a specific task or concept. The combined focus of the different media and activities provides a student with multiple means of learning and reinforcing concepts. Each of these optional means can be selected to accommodate the personal learning preferences and needs of a particular student.

An object of the invention is to provide a learning system that can accommodate students with differing native languages. This is accomplished in the exemplary embodiment through the use of a template and database system wherein computer activity templates are programmed to perform a task or carry out an exercise. An activity template accesses data stored in a multilingual language database. The user's primary language and, if the system is being used to learn a foreign language, the target language are selected. The template accesses the appropriate language databases according to this selection and the user is thereby able to access the system in the appropriate language. Once a selection has been made the student may access program modules in that language which control use of the activity templates. This feature makes the system particularly suitable for multi-national classes where students in the same class can access learning materials in their different native languages.

Another object of the invention is to provide a review method and system which optimize study efficiency by managing the content of review sessions according to each student's individual familiarity with those concepts. A systematic spaced review method gauges a student's long-term retention, understanding and familiarity with a concept by measuring, recording and monitoring the student's speed and accuracy of response to a prompt. If a student has mastered a concept her response will be quick and accurate and the system will recognize this familiarity and remove that concept from study until the next major review session. If the student responds inaccurately and slowly the system will recognize the need for additional study on that concept and will keep the concept in active study sessions until it is mastered. This method optimizes study time by allowing the student to concentrate on the most challenging concepts while the less challenging concepts already mastered by the student are removed from study until infrequent review sessions. In this manner, concepts are ranked by familiarity in a series of review pools in which concepts are stored and then used in subsequent study exercises at a frequency which is inversely proportional to each student's mastery of the concept. This process is accomplished by the system without the active knowledge or conscious effort of the student or instructor which further frees both to focus on an individualized learning experience.

Another object of the invention is to provide a concept tagging method and system whereby a database of words, phrases, sentences and other similar language constructs is analyzed to identify specific grammar, syntax, vocabulary or other language structure or concepts. The constructs containing the specific language structure or concept that is being analyzed are, then, tagged to identify the presence of the concept of structure so that the database can be manipulated and accessed according to the tagged grammar, syntax, vocabulary or other language structure or concept. This tagging allows the system to arrange material in order of complexity and to expose the student to concepts and concept examples of gradually increasing complexity to optimize learning with a steady flow of challenging concepts and to avoid the distractions of material divided into separate and distinct lessons.

While learning a new discipline or language, a student becomes more proficient earlier in the learning process when the student learns to speak phrases or use new terminology in the foreign language or target discipline from the onset of instruction. An object of the present invention is to provide a method or system whereby the student can learn to speak or use new phrases through an interactive computerized tutor that adapts to the student's ability by offering more difficult exercises as the simpler exercises are successfully completed. This is not performed with static pre-formulated lessons, but in phrase-specific exercises that dynamically adapt with each student response. For example, a phrase in a foreign language or a new medical or technical term might be introduced in two parts and the student asked to assemble the phrase in the proper order. If the student successfully assembles the phrase, the next time it is presented the phrase will be presented differently, perhaps divided into several more parts, or contain a higher number of "distractors," distracting false answer options, to provide a higher degree of difficulty at each iteration of the phrase. If the student answers incorrectly, the phrase is also presented differently, typically in fewer segments with fewer distractors until the correct order is selected by the student. This same concept of adapting the activity's difficulty to gradually reach mastery is used further in another part of the module or system where a definition is given in a known language as a prompt for the student to input the corresponding foreign word or phrase or technical term. If the response is incorrect, the correct answer is shown to the student, after which the student is prompted with a version of the correct response with portions blanked out. The student is also provided with hints leading the student to the correct response, if necessary. As the learner answers correctly, the hints are gradually removed, whereas if the learner continues to struggle, more hints are added. In this way, the system is dynamically customizing the learning experience to each user.

In addition to the above objects of the invention, the system and method of the present invention will relieve the instructor of the responsibilities of and perform the functions of monitoring student progress, tailoring materials to individual students and their varying levels of progress, developing testing materials to gauge progress and proficiency, and developing study aids to help students master particular challenges. The system and method also benefits students generally by providing systems and methods which allow students to study at their own pace on an individual basis thereby providing an optimum level of challenge for all students.

BRIEF DESCRIPTION OF THE DRAWINGS

In order that the manner in which the above-recited and other advantages and objects of the invention are obtained, a more particular description of the invention briefly depicted above will be rendered by reference to a specific embodiment thereof which is illustrated in the appended drawings. With the understanding that these drawings depict only a typical embodiment of the invention and are not therefore to be considered to be limiting of its scope, the invention will be described and explained with additional specificity and detail through the use of the accompanying drawings in which:

FIG. 10 is a table which demonstrates the progress of learning items during a typical review session as the student makes various responses.

DETAILED DESCRIPTION OF THE PREFERRED EMBODIMENT

Including, by express reference, the figures listed above as part of this detailed description.

System Overview

The present invention is referred to as the technology assisted learning (TAL) system. The TAL system may include classroom activities, print materials, practice activities, computer activities and simulation activities that are linked together to provide the student with the experiences and skills necessary to learn and understand new information, concepts or skills and retain them in long-term memory. The system may also be used to learn to perform various tasks in a target subject matter, be it a language, science, technology or trade. The TAL system may be implemented through a wholly computerized system, on a single computer or networked with any number of computers, when the more conventional classroom exercises are not convenient or possible.

When classroom exercises are available, students are introduced to a learning task in the classroom that they will need to perform in the target subject matter, for example speaking simple phrases that are required to perform a specific task. The teachers may use a videodisc or videotape player or a computer to show segments of video in which others who have mastered the task are seen performing the task. Audio recordings may also be used where video capability is not convenient. Later the students may study the task in the computer lab with the TAL software described herein. They can record their voice as they attempt a task, study tasks, drill themselves on phrases or vocabulary, study additional principles, work on their listening comprehension, and create their own study materials and audio recordings.

When a sufficient number of teachers are available, a student may practice performing the task with the teacher. After the simulation, the teacher may give feedback. It should be noted, however, that the TAL system may be successfully and efficiently implemented without the aid of professional instructors once the system has been configured for the type of instruction desired.

Computer Hardware

Figure 1:
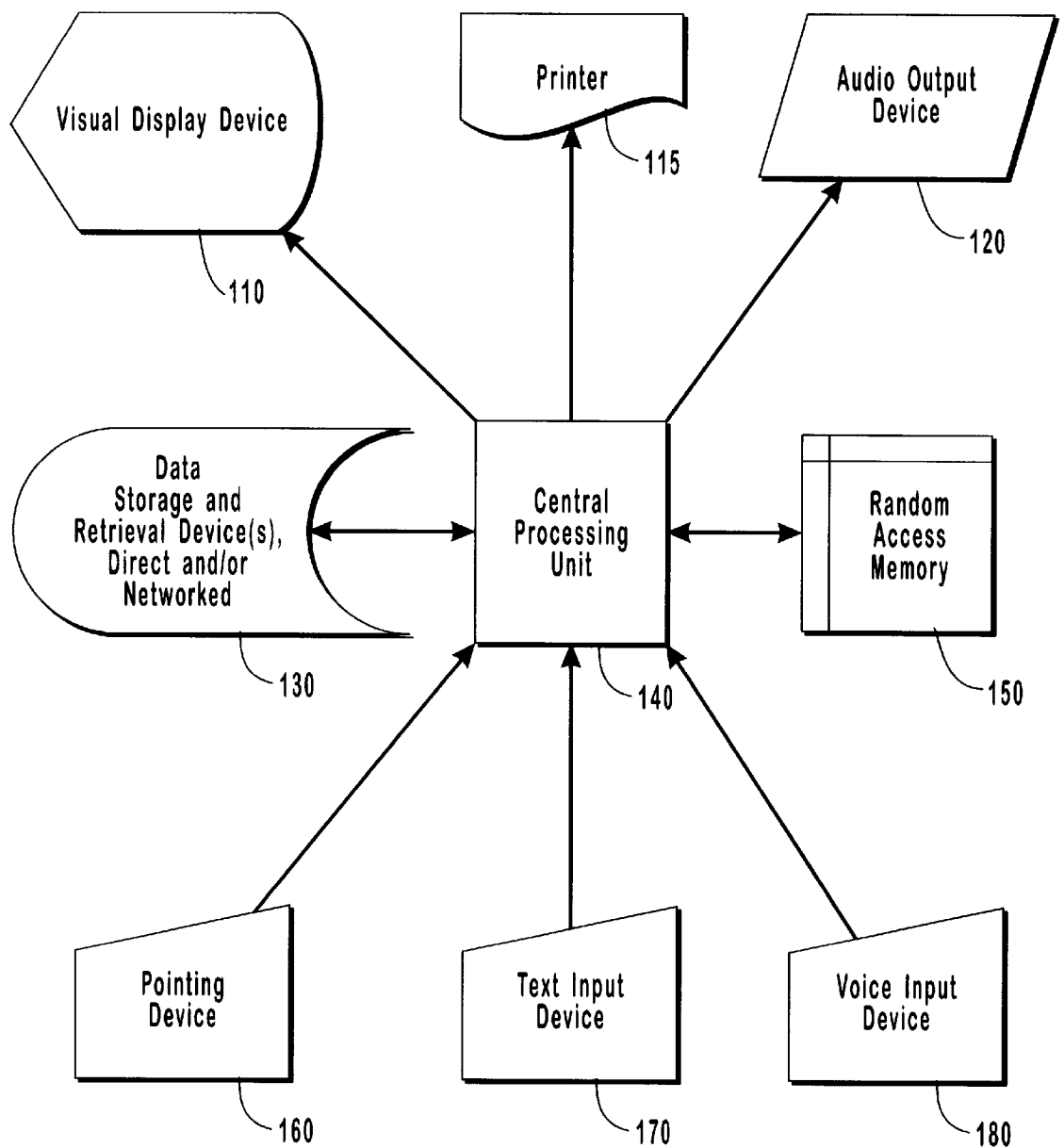
FIG. 1 is a typical hardware system diagram for the present invention.

The computer implemented portion of the present invention may be implemented on a computer hardware system as shown in FIG. 1. A typical computer hardware system used for the present invention may use any one or more of numerous operating systems and microprocessors, however the system will typically be comprised of: a visual display device 110 such as a cathode ray tube (CRT), light emitting diode display (LED), or other standard display device known in the industry; a text output device such as a printer 115; an audio output device 120 such as a sound card and speakers capable of emulating spoken language; data storage and retrieval devices 130, either direct or networked such as hard drives, floppy drives, tape drives and other storage devices; a central processing unit (CPU) 140 for executing the program instructions and sending and receiving instructions to and from the peripheral devices; a random access memory 150 for ready storage and access of programs, operating system instructions and data; a pointing device 160 such as a mouse, trackball, touch screen or other device for selecting optional inputs displayed on the visual display device; a text input device 170 such as a keyboard for input of responses and selection of optional choices presented by the program; a voice input device 180 such as a microphone for recording and digitizing the user's voice.

Program Structure

Important elements of the present invention include the use of databases and templates. The content for each subject matter to be learned, such as a foreign language, is stored in a database. This allows vast amounts of material to be universally and easily stored, input, accessed, transported, replaced and updated. Content from the database can then be used to generate learning activities and print materials for the target discipline. Software templates, computer programs which access and manipulate database information, are used to create interactive learning activities. These templates are programmed to be flexible so that they can be configured into any number of activities using different database content. In the preferred embodiment, templates are grouped into programs or modules which are divided according to their learning area or purpose.

Each template, within a program module, can call on any subject matter database (i.e., language database, medical terminology database, etc.) to draw content for presentation to the user. The templates include applications for: task-oriented learning activities, grammar exercises, vocabulary exercises, phrase memorization and comprehension, listening comprehension, and creating customized learning for individualized needs, preferences, or review. The activity templates, one or more subject matter databases, individual learner progress tracking databases and the programs that link and manipulate them comprise the TAL software.

Figure 2:
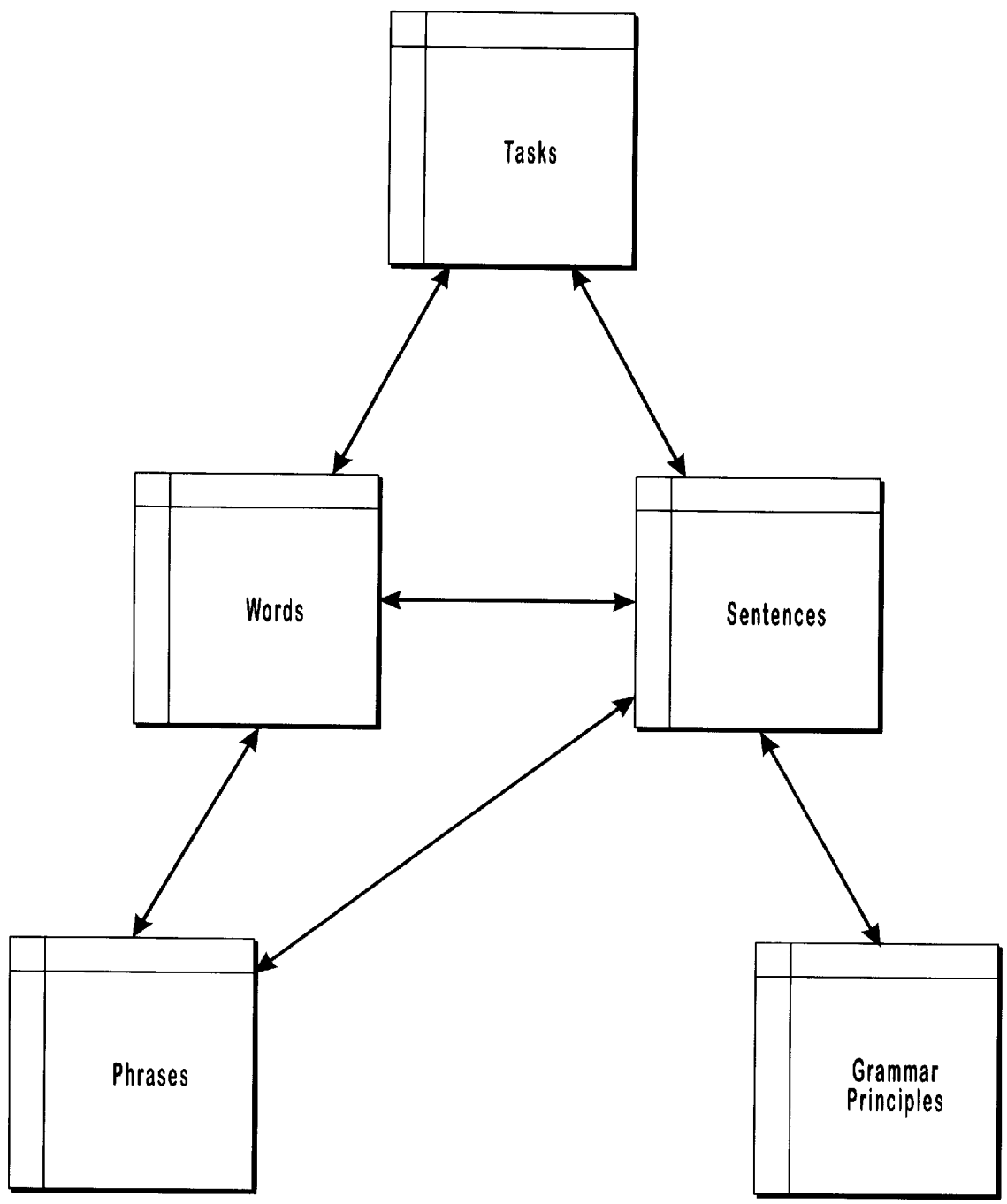
FIG. 2 is a graphical representation of the linked relationship between database tables.

The database contains all the content information or learning items supplied by the content experts. To maximize the number of ways the content can be used, the content is organized into tables that are linked to one another in a unique fashion. As shown in FIG. 2, the prominent tables are the Tasks, Sentences, Words, Phrases, and Grammar Principles tables. Each of these tables holds information about each instance of that type of content. For example, the Grammar Principles table contains a record for each grammar principle, which includes fields such as the name of the principle, the difficulty, the type, and the activity track used to teach the principle.

The two-way arrows in FIG. 2 symbolize the relationships between the tables. Typically these relationships are defined in the database with additional tables. For example, there is a Grammar-Sentence table that relates grammar principles to sentences. This table is created as a result of the grammar tagging process described in this description of the preferred embodiment. The Grammar-Sentence table defines a many-to-many relationship between the Grammar Principles and Sentences tables. Therefore, each record in the Grammar- Sentence table refers to a record in the Sentences table as well as to a record in the Grammar Principles table. This table also has fields that specify which words in the sentence relate to the grammar principle, and whether it is a good example, a poor example, or a non-example. These specialized links and tables enable the activity templates to draw upon the database content so as to greatly increase the variety of potential activities.

Use of the content from a database is maximized by drawing on it from various templates. For example, a single language sentence from the database may be used as part of a task dialogue, as a grammar translation activity sentence, as a phrase sample sentence, as a listening comprehension distractor, as a vocabulary fill-in-the-blank sentence, and edited to create individualized exercises. Similarly, maximum efficiency is achieved when a single template accesses as many subject matter databases as possible.

Concept Tagging System

One important and novel aspect of the present invention is the ability to tag a database to identify the presence of conceptual principles in the database elements. This principle can be applied to databases containing elements of many genres (i.e., mathematical equations, medical terminology, language grammar, vocabulary, etc.) which are referred to as learning items. In the preferred embodiment of the present invention textual elements are tagged for various grammar principles such as verb conjugation, subject pronouns, or prepositions for use in foreign language training.

Figure 3:
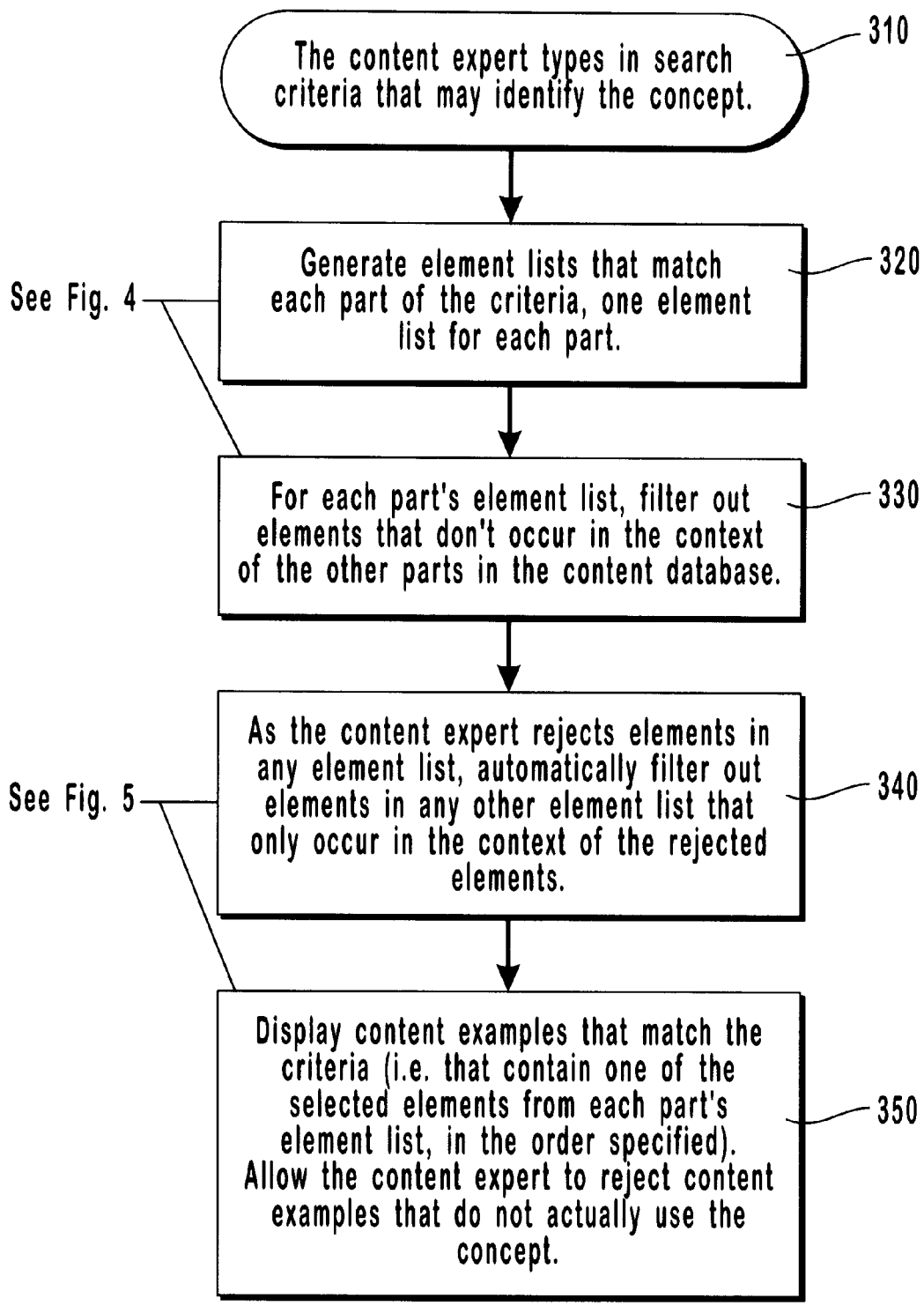
FIG. 3 shows the steps of the process by which the present invention tags content examples using the concept tagging system.

An example concept tagging system is outlined in FIG. 3. Prior to tagging, all the sentences (and the words they contain) are entered into the content database. When used for foreign language instruction, these sentences and words are translated and linked to their foreign language counterparts. Once this data is entered into the database, the grammar tagging process begins. Based on his/her understanding of the grammar patterns of the language, the content expert supplies search criteria to the grammar tagging program 310 that will likely identify example sentences of a particular grammar principle.

Figure 4:
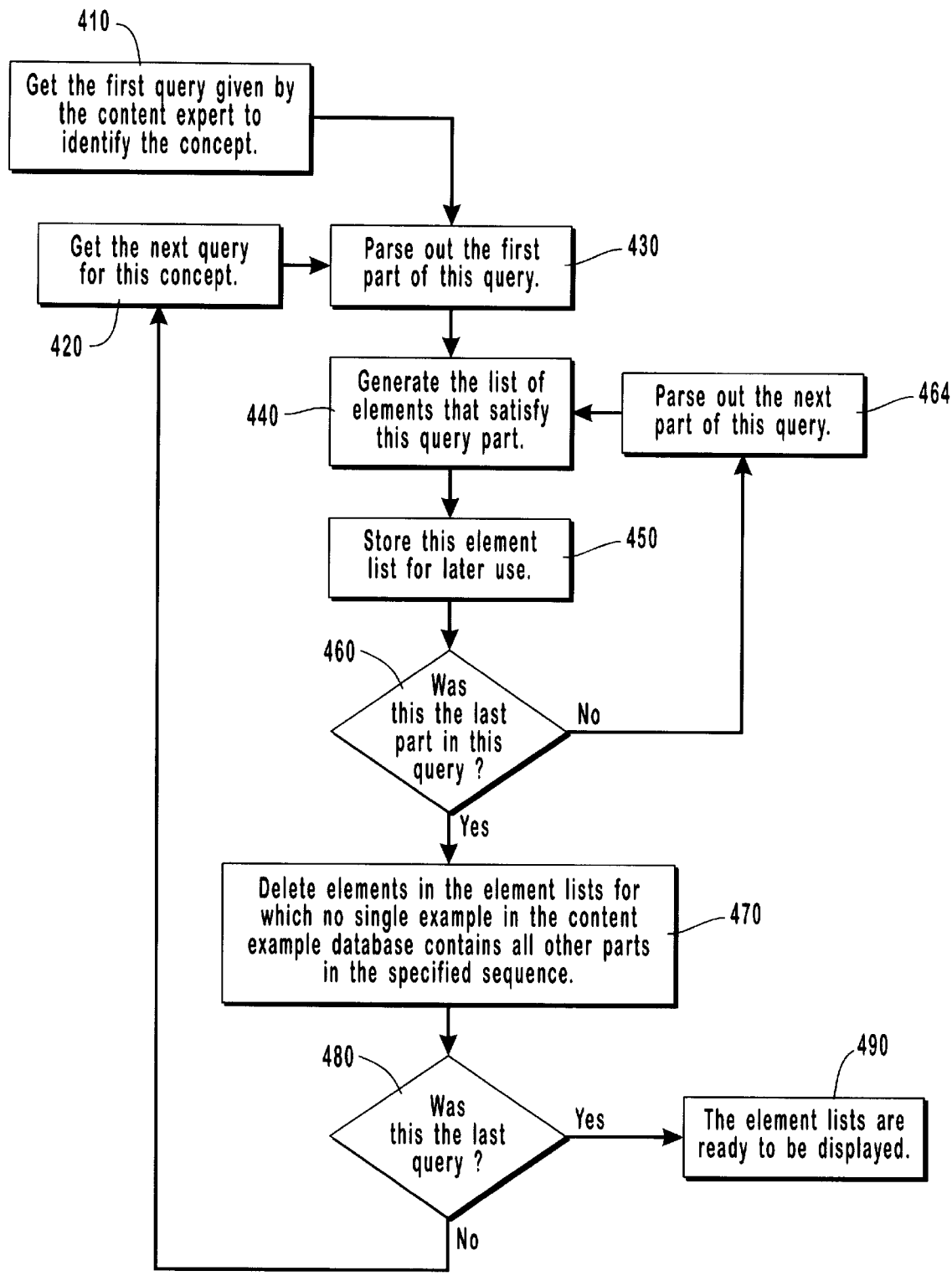
FIG. 4 is a flow diagram showing the steps involved in generating element lists within the concept tagging system. The steps in FIG. 4 are performed within blocks 320 and 330 of FIG. 3.

Search criteria may be entered in a number of ways, but in the preferred embodiment the criteria are divided into individual queries of particular principles and further divided into query parts. Parts are space delimited while queries are comma delimited. A typical search criteria might look like the following: *te *ia, *ta og; where the criteria contains two queries each with two parts (the *'s act as wild card characters similar to other common applications). Once the search criteria have been identified and entered, the present invention will generate element lists that match each part of the search criteria 320. This process is demonstrated in FIG. 4. The invention begins by taking the first query in the criteria 410. This query is parsed into its parts 430 and an element list is generated 440 and stored 450 for each part of the query. After the last part in the query has been parsed 464 and its element list generated and stored 460, the present invention will then delete elements from these part-specific element lists for which a single content example does not contain all parts of the query 470 and 330. For example, if the element is found solely in a content example sentence that contains grammar corresponding to only one part of the query and the query has multiple parts, that element will be eliminated from the element list. This process is repeated for each query 480, then the element lists are displayed 490 to the user. Referring again to FIG. 3, the next step of the concept tagging process involves the content expert who manually eliminates elements from the element lists generated in the previous steps 340. This process is shown in more detail in FIG. 5. The process begins with a display of the element list corresponding to the first part of the query 505. While inspecting the list, the content expert manually rejects elements that do not correspond to the desired concept 510. This selection is recorded 515, and used to filter out elements from the other part-specific element lists that are no longer valid due to the rejections 540. This process continues for each element list 535 until the last list has been recorded 520. The invention then finds content examples that contain all elements of a given query 525 and displays these examples 530. At this point the content expert is given another opportunity to reject examples that do not accurately represent the desired concept 545. The content examples that are not rejected are then recorded as examples of the desired concept 550 for potential use in the various activities of the program.

In the preferred embodiment, the tagging program responds to the search criteria by generating a list of words for each part of the search criteria, and allows the content expert to refine each word list by rejecting words or word usages that do not relate to the learning concept at hand. Then all the sentences are displayed which contain words from each of the refined word lists, for each query, in the order specified. Finally, the content expert browses through this list of sentences and rejects any that do not apply. This process is repeated for each learning concept such as grammar.

Several aspects of the tagging system make it especially powerful and efficient: word-based rejection, automatic contextual filtering, and special criteria features.

Word-Based Rejection

Word-based rejection speeds up the tagging process because it allows categorical rejection of sentences that are not examples of the learning concept. For example, instead of having to pour through and reject 100 sentences out of 300, the content expert might be able to categorically eliminate the 100 sentences by simply rejecting one word from a word list. This is possible if all the sentences to reject have a particular word in common, which is quite often the case. Based on the inventor's experience with tagging the grammar of several languages during experimental use, word-based rejection consistently speeds up the tagging process. Moreover, the word rejection system is enhanced by allowing the content expert to accept or reject sentences with a particular usage of a word that has multiple meanings (glosses). For example, in Spanish the word "como" means both "I eat" and "as, like". Previously the content expert specified which gloss was intended for every sentence with the word "como". This content work had to be done earlier for another purpose. The grammar tagging system shows two instances of the word "como" in the word lists, along with the associated gloss. Then the content expert can choose to reject sentences that use a particular gloss of the word. If the grammar principle is Present -ER Verb Conjugation, the content expert simply selects the "I eat" instances of "como" and rejects the "as, like" instances in a single step rather than going through each example individually. Time is saved by rejecting several sentences automatically through a single gloss rejection.

Automatic Contextual Filtering

Automatic contextual filtering expedites grammar tagging by reducing the number of selection/rejection choices the content expert makes. Merely matching the search criteria is not a sufficient condition for a given element to appear in an element list. The element in question must also appear in at least one content example, in the context of the other elements that satisfy the other criteria parts. All other candidate elements are filtered out initially before displaying the element lists to the content expert. Furthermore, the element must appear in the context of elements that are not subsequently rejected by the content expert. This is ensured through a second filter that is reapplied with every word rejection. Only the elements that pass both of these filters are presented for consideration. Note that rejecting a single element in one element list could cause several elements in other element lists to be removed from consideration.

Special Criteria Features

Special criteria features provide the content expert with powerful ways of specifying which elements to consider. The four special criteria features in the preferred embodiment are target word search text, definition search text, parent search text and verb search text.

Target Word Search Text. This is the most basic criteria. To illustrate, imagine that the Spanish content expert needs to find all instances of the conditional tense. One target word search text might be "*ía*", since every conditional verb conjunction includes the part "ía". Note that the asterisks here act as wild-card characters, and indicate that "ía" may be followed and preceded by zero or more characters.

Definition Search Text. This feature searches the definition field of each database element for specific text. For example, to search for all words that are examples of the imperative tense, the content expert might search the definition field using the criteria "*command*". This criteria would be sufficient, assuming that the specified definition of every command form included the text "command". This would be the case, if the content expert has previously defined words in the imperative tense with that term, for example: "tenga" defined as "have (command)", and "coman" defined as "eat (command)", and so on.

Parent Search Text. This criteria feature allows the content expert to find all words that have the same kind of parent (root word). For instance, to find all conjugations of the verb "ser", the user would search the parent field using the criteria "PARENT{ser}". Any of these criteria features can be used in combination, making the search abilities even greater. For example, to find all the conditional conjugations of -AR verbs in Spanish, the criteria would be "*ía*.PARENT{*ar}". Note that a period separates each element of the criteria. To find all subjunctive conjugations of -ER verbs, the criteria would be "EN{*subj*}.PARENT{*er}".

Verb Search Text. Verb search text allows the content expert to find all conjugations of a certain tense, person, or other characteristics. To expedite the tagging of sentences containing verbs, special criteria are used to identify certain features. Verbs are stored in a portion of the database called the verb table. Every verb in the verb table is conjugated either automatically using identified verb classes or manually for special irregular verbs or when automatic conjugation is not available. The conjugated forms of verbs are then linked to the word table through a verb criteria table which identifies the conjugation type, tense, person, and verb parentage. While tagging, the content expert can specify certain criteria for a desired list of verbs and the tagging system will locate those verbs using the linked verb criteria table. For example, the content expert may specify criteria defining a list of words that are verbs which have regular conjugation, present tense and first person singular form.

Multiple Set Search Criteria

Another aspect of the concept tagging system is also important. The content expert can specify multiple sets of search criteria for a single principle. Each set is separated by a comma. To find sentences (content examples) that illustrate Spanish regular number/gender, the sets of criteria might be "*o *o, *a *a, *os *os, *as *as".

Element List Rejection Optimization

Another useful aspect of the concept tagging system is how the element lists are presented to the content expert. The shortest element lists are presented for consideration first. (Except that element lists that could only contain one element are not shown at all. The search criteria "hay" can only match a single word in Spanish, for instance.) Presenting the shortest lists first minimizes the number of rejections the content expert makes because elements rejected by the content expert are automatically rejected in subsequent lists. The reason for this is that rejecting a single element from an n-sized list will tend to eliminate the need to consider m/n elements in an accompanying m-sized list, since for each element in the m-sized list, the probability of getting removed from consideration is about 1/n. To see why the probability for removal is 1/n, consider the fact that each element in the m-sized list must appear in some content example with an element in the n-sized list. Without any other information, it is just as likely for the elements in one list to depend on any given element in another list. Therefore each element in the n-sized list will likely be tied to m/n elements in the m-sized list. (To be precise, the probability is lower than m/n, since an element in the m-sized list can be associated with more than one element in the n-sized list. But the same line of reasoning still holds true.) Hence automatic contextual filtering will tend to remove m/n items from the m-sized list for each rejection in the n-sized list. To maximize the automatic filtering and minimize the decision making of the content expert, m should be kept large as possible and n as small as possible. And this is why the smallest element lists are presented for consideration first.

Relevant Segment Marking

Another feature of the present invention is the concept tagging system's ability to automatically determine which part of each element relates to the learning concept based on the search criteria that was fulfilled. Using another language database example, if the search criteria is "*te kudasai", then the part of the sentence that says "te kudasai" is automatically marked as the relevant segment. In cases where no useful search criteria can be found, the concept tagging system allows the content expert to pick example sentences out of all sentences in the database, and to specify manually which part of the sentence relates to the grammar principle.

Adaptable Language Learning Array

Another advantage of the present invention over the prior art is that students with various native languages can be instructed in a single target subject matter such as a foreign language, using one content database. Instructions, button captions, and other instructional text are automatically imported from the database into the running program in each student's native language. This is especially useful in applications for teaching ESL (English as a Second Language), where the students' native languages may vary. Because the system is individually configurable for each student, the system may be used to instruct any number of students with differing native languages in different target languages or disciplines all while monitoring, recording and reporting the individual progress of each student. In this manner the system may be used to teach native French, Spanish and English speaking students any given language for which a database has been configured or they might each be taught a different language or discipline at the same time.

Individual Learning Activities or Applications

The actual activities presented to a student will vary widely with the subject matter being studied. Typically, introductory activities are used to present new concepts, followed by review activities and, ultimately, testing activities. Other advanced activities may also be used to increase comprehension beyond the testing stage. These activities are collectively known as learning activities.

In the preferred embodiment, the system is used for foreign language training and is referred to as the Technology Assisted Language Learning (TALL) system. In this preferred embodiment, activities are used to introduce, review, test and enhance comprehension of grammar, vocabulary or phrase memorization concepts.

Introductory Grammar Activities. These activities are used in the new or first stage of the track. In the preferred embodiment, Grammar concepts are introduced using any or a specified combination of the following activities.

Example Sentences—Guess the Rule: wherein a series of sentences is presented and the student is prompted to guess the rule of grammar common to the sentences.

Grammar Explanation: wherein a straightforward explanation of a specific grammar principle is displayed. This is typically used with the guess the rule exercise to explain the correct answer.

Repeat after Native Speaker: wherein a recording of a native speaker is played and the student is prompted to record and play back his own pronunciation the phrase for pronunciation purposes in order to increase familiarity with the sentence and grammar principle.

Identify Example Sentence: wherein a series of sentences is presented audibly or visually and the student is prompted to select the sentence containing a specified grammar principle.

Guided Translation: wherein multiple columns of words are presented to the student who is prompted to select a word from each column to form a foreign language equivalent of a specified native language phrase.

The following grammar review activities may also be used to introduce new concepts when combined with the Grammar Explanation above.

Grammar Review Activities. These activities are used in the review grammar stage of the preferred embodiment.

Identify General Meaning: wherein a student selects a native language rough translation from a selection of target language phrases.

Multiple Choice Completion: wherein a student is prompted to fill in a blank portion of a foreign language sentence from a selection of possible fillers, one of which best represents a grammar principle.

Large Context Multiple Choice: similar to multiple choice completion above, but multiple blanks are displayed within an entire paragraph.

Fill-in-the-Blank Completion: similar to multiple choice completion above, except the student is prompted to fill in a blank in a target language phrase by simply typing the correct word in its proper location without alternative selections. The native language translation may be displayed to avoid ambiguity.

Large Context Fill-in-the-Blank: similar to fill-in-the-blank completion above, but multiple blanks are displayed within an entire paragraph.

Entire Box Form Conjugation: wherein a verb is displayed in the infinitive form and various blank boxes are displayed into which the student is prompted to type the conjugated form of the verb. In Japanese, this activity can be used for the seven verb bases and the desu and masu boxes.

Single Box-Element Form Conjugation: similar to entire box form conjugation above, but with only a single box. The form desired to be input is denoted with a native language translation or a description of the form.

Transform Sentence or Dehydrated Sentence: wherein a target language sentence is displayed and the student is prompted to modify the sentence using a specific grammar principle. For example, the student may be prompted to change the verb tense. Multiple transformations may also be used.

Answer Questions Related to Grammar: wherein the student is prompted to answer a question about a target language phrase requiring knowledge of a grammar principle. The phrase may be presented in audible form or in textual form and the answer may be selected using a multiple choice format or a type-in format.

Listen for Grammar: A target language audio segment is played and the student is prompted to respond via mouse of keyboard when the specified grammar principle is played. The text of the audio segment is then displayed and the student is prompted to translate into her native language. A model translation is then shown so the student can assess her translation ability.

Situational Grammar Production or Transformation: The student is prompted to perform a short task or series of tasks in the target language wherein the student's voice is recorded in performing the task. A recording of a model response is then played. The student compares his recording to the model response to assess his performance.

Grammar Test Activities. In the preferred embodiment, the content expert will select one or more of the above review activities for the test stage.

Multiple Principle Grammar Activities. These activities are used outside the normal activity track to build student mastery of a concept. They involve multiple grammar principles.

Sentence Builder: This activity involves a growing sentence which is added upon in each step. The activity displays a basic native language sentence with a prompt to translate (i.e., I eat). This step is then checked for accuracy and corrections are made when necessary. The next step adds to this initial sentence (i.e., I eat cake). The new response is checked for accuracy and so on until a complex sentence is completed. Student responses are formed from a selection list displayed on the screen.

Question and Answer Sentence Builder: A question is asked in a target language and the student is prompted to respond by building a response from words and phrases displayed in a box on the screen. This response is then corrected and a follow-up question is asked with similar structure to the first, but with increased complexity. The process goes on until all phrases and words in the answer selection box are used.

Open-Ended Grammar Activities. These activities are used outside the normal activity track to build student mastery of a concept. They involve the application of grammar principles to open-ended language production.

Create Sentences: The student is prompted to create a number of sentences in the target language using several specified grammar principles. This response is sent to an instructor for feedback.

Practice What You Have Learned: A question situation is presented in text form and the student is prompted to respond by typing. This situation and response are sent to the instructor for review.

Translate Sentence: A sentence is presented in text or audio form in either a native or target language and the student is prompted to respond in the alternative language form, target or native language respectively.

Introductory Vocabulary Activities. These activities are used in the new or first stage of the track. In the preferred embodiment, vocabulary words and phrases are introduced using the following activity.

Flash Cards: The vocabulary item is displayed along with the native language translation which can be selectively removed from display. Sentences known to the student are also used as examples of the vocabulary item. Audio files corresponding to the sentences and the vocabulary item are available for obtaining an audible familiarity. The student is encouraged to deselect the native language translation to enhance memorization.

Vocabulary Review Activities. These activities are used in the review vocabulary stage of the preferred embodiment.

Multiple Choice: The student is given a word in audio or text format in the target or native language and prompted to select its equivalent in the other language from a list of selections given in audio or text format.

Typing in Context: A native language sentence is given and the student is prompted to complete a target language translation of the sentence by filling in blanked out words.

Typing out of Context: A native language word is given and the student is prompted to type the target language translation.

Vocabulary Test Activities. In the preferred embodiment, the typing out of context activity is used for testing purposes.

Introductory Phrase Activities. These activities are used in the new or first stage of the track. In the preferred embodiment, phrases are introduced using the following activity.

Flash Cards: This activity is the same as the flash card activity described in the vocabulary section above except phrases are used rather than single words.

Phrase Review Activities. These activities are used in the phrase review stage of the preferred embodiment.

Multiple Choice: This activity is similar to the vocabulary version described above except phrases are used in lieu of words and additional combinations of prompt and response options are used (i.e., phrase with filler, phrase with example sentence).

Recite: The student is prompted to recite a phrase in the target language when prompted with a native language phrase. The correct answer is then revealed in text form and the student is prompted to indicate the correctness of the response via pointing device or keyboard.

Order Parts: A target language phrase is divided into several parts and the student is prompted to assemble the parts. A native language translation is provided to indicate the desired response. This activity utilizes a novel prompting process which is further explained in the section on Interactive Phrase Memorization.

Progressive Typing: A native language phrase is displayed and the student is prompted to type the target language translation. Hints are given in a novel process further explained in the section on Interactive Phrase Memorization.

Phrase Test Activity. The progressive typing activity is used as the test activity in the preferred embodiment.

These activities may be used in any combination as designated by the instructional designer and the content expert according to the needs of the student and the field of study.

Pool Learning System

Another advance of the present invention over the prior art is the employment of "pool" review. The Pool Learning System provides for systematically spaced review based on the correctness and speed of each learner's individual, current and earlier responses. For example, in the language application of the preferred embodiment, this technique is applied to the review of grammar principles, phrases and vocabulary. The same concepts apply to learning new terminology of a trade or profession and learning to perform mathematical operations.

Activity Tracks

Each item (i.e., medical term, grammar concept, vocabulary word) that is to be learned in the pool learning system is entered into a database and assigned a sequence of instructional activities. These sequences are referred to as activity tracks. The content expert, a person who adapts the learning content to the system, assigns activity tracks to each item in the database. For example, in a language application vocabulary items may all share a single activity track. Phrases may share another single track. Grammar principles may have a number of separate tracks and may even have a separate track for each principle or item. The reason for using several distinct tracks for teaching grammar principles is that the skills they entail vary widely, compared to vocabulary and phrases. Other fields of study may follow a similar pattern.

Figure 6:
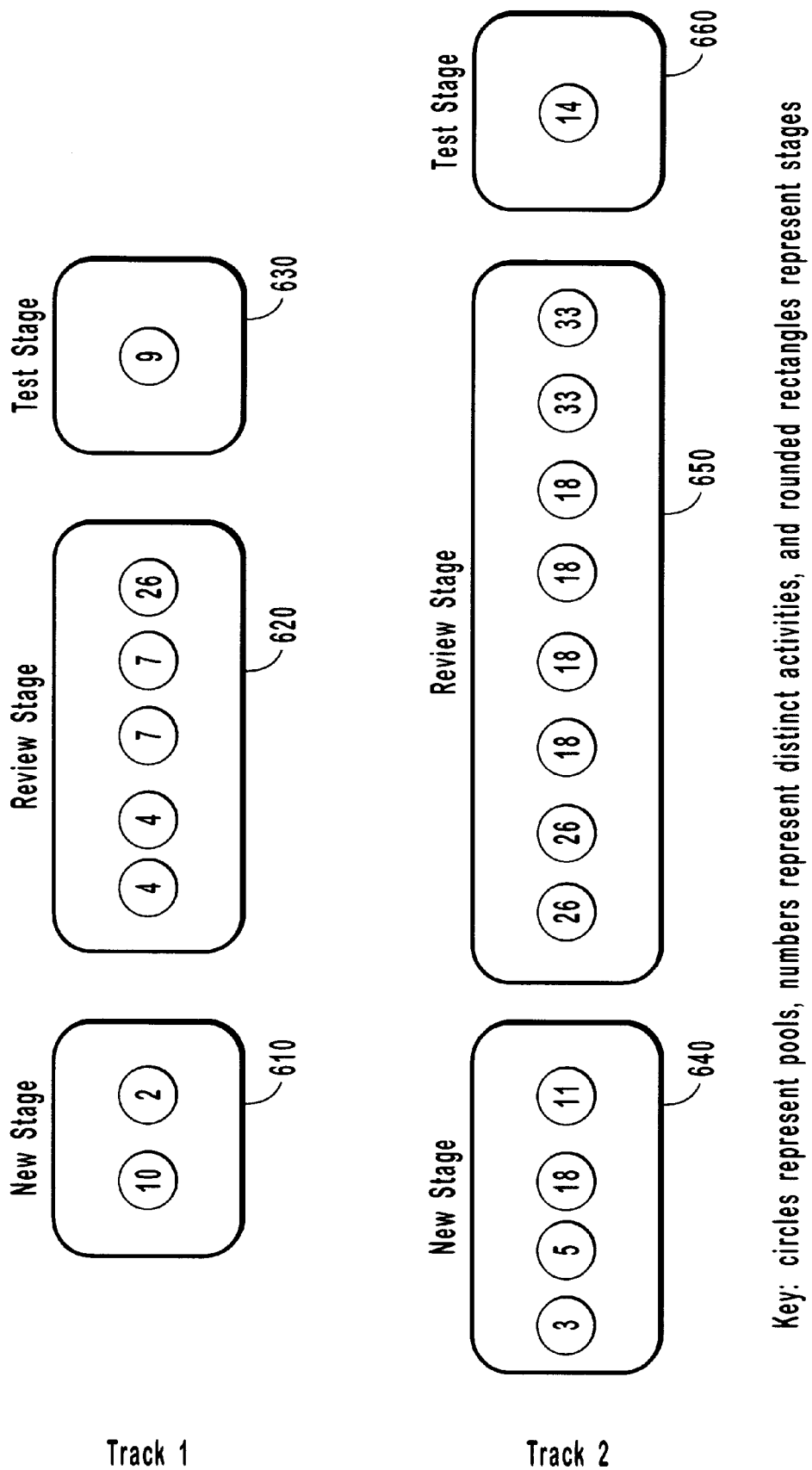
FIG. 6 depicts two examples of the activity tracks which are assigned to learning items.

The activity track specifies the sequence of activities used to introduce, review, and test the item. FIG. 6 shows example activity tracks wherein Track 1 may represent an activity track for a vocabulary item and Track 2 may represent an activity track for a grammar principle. Easy/receptive activities occur at the beginning of the track, and difficult/productive activities occur toward the end. Generally, every activity in the track is as difficult or more difficult than the preceding activity. For example, the track for vocabulary items begins with a computerized flash card exercise, moves to a multiple choice exercise and then to typing in context and typing out of context at the end of the track.

Learning or Review Pools

Each occurrence of an activity is directly related to a learning pool, or review pool. The term pool reflects the fact that several items may be at the same point of progress in the track, and hence form a pool of items to draw upon for review or testing. The pool represents or contains all of the items available for use in a specific activity. Several pools may be accessible to a student, but each may be accessible through a different activity.

Stages

The pools of a track are normally grouped into three stages: new, review and test as shown in FIG. 1. In the new stage 610 or 640, items are introduced one at a time. In a language training application example, the flow of activities in the new stage may run something like this: (1) give example sentences that help the student discover how the item is used in real language, (2) provide a concise definition or explanation of how the item can be applied in general, (3) invite the student to practice using the item via several simple activities that require some understanding of the item. In order to establish an initial firm foundation, the student is typically allowed and encouraged to advance through all the pools in the new stage within a single study session.

In the review stage 620 or 650, a pool of items are studied together. All the items that are ready for a particular activity are brought together to form a working group. Questions about these items are randomly presented to the student in the format of the current activity. After the student has reviewed all of the items ready for this activity, the next activity is chosen and so the cycle begins again. A feature of this portion of the present invention is the ability to limit the student's exposure to a given item to a single type of activity per day. For example, in one day a student may review items K, L, and M with activity 14, then items Q, R, S, and T with activity 12, and items H, I, and J with activity 75. But, the student must wait until the next day to study items K, L, and M with the activity that follows activity 14. The same is true of Q, R, S, T, H, I and J. Thus, the review process is systematically spaced over time to ensure the item is retained beyond short term memory.

In the test stage 630 or 660, all the items ready for testing are presented to the student one by one, for as long as the session lasts. Rather than recycling questions about each item via a working group, the student is simply given one opportunity to respond appropriately to each item. Also, there is a delay of several days between the review stage and test stage. Asking one question per item and using a delay between review and testing of an item allows the user of the present invention to assess whether the student has retained the item in mid-term or long-term memory. The format of the question is determined by the item's current activity, specified in the test stage of the track. If the student answers a test question correctly, that item is considered mastered. If missed, the item regresses to the review stage.

Working Group

The working group consists of all the items (medical terms, grammar principles, vocabulary, etc.) that are currently being presented to the student by the program for review. As items are successfully reviewed and leave the working group, new items take their place from a current pool, so that the number of items in the working group remains constant. The size of the working group depends on which activity is being used for the review, as well as the item type being studied. This is important since each activity and item type place different mental demands upon the student. For example, the working group size may be 7 when reviewing vocabulary with the multiple choice activity, and the working group size may be 2 when reviewing verb conjugation patterns which require the student to conjugate a verb in a given tense. The present invention allows the instructor to adapt the working group size to the subject matter and the student's retention patterns.

Pool Progression and Regression

Figure 7:
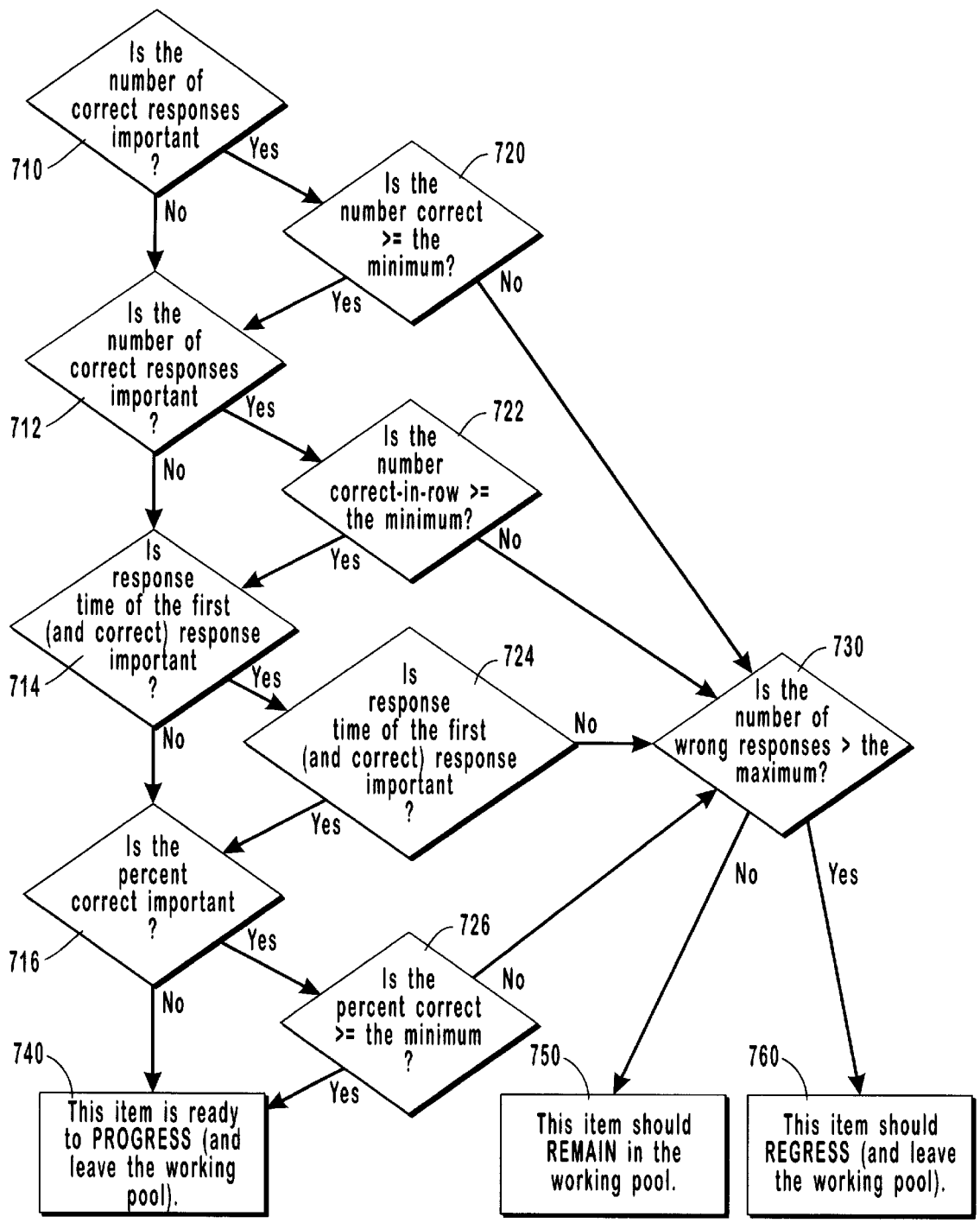
FIG. 7 demonstrates the process used to determine if an item progresses from the working group or is held within the working group for further review.

During the course of an activity the present invention analyzes the student's responses to determine how well the student knows the concepts associated with a given item. When a student responds to a question about an item the present invention will progress that item to a more advanced pool for future review, hold that item in the present working pool for further study during the present session, or regress the item to a previous pool for study in a less advanced activity. In this way the system sorts the items into different review pools. After every response from the student, the present invention determines whether the item to which the student just responded is ready to leave the working group. Note that there are two reasons an item may leave the working group: (1) the student is struggling so much with the item that an easier activity would be more appropriate, (2) the student has responded well enough to meet the minimum criteria for advancing the item to a higher pool. If neither of these criteria are fulfilled, the item is simply held in the working group for further review. Refer to FIG. 7 for the specific steps of the process.

To determine whether the item is ready for advancement, many criteria may be taken into account. In the preferred embodiment any of four specific criteria are typically used: the number of correct responses to questions about the item in the current review session, the recent number of correct responses in-a-row, the relative speed of the first response (assuming that the first response was correct), and the percent of correct responses. All of these factors (the number correct, percent correct, etc.) depend only on the student's performance in the current review session, for the item in question. In other words, only questions since the formation of the current working group are taken into account. The instructional designer, a person who selects and modifies system variables to optimize instruction, specifies which of the four criteria shown at 710, 712, 714, and 716 in FIG. 7 are important to achieve mastery of each activity. Since each activity is distinct instructionally, their sets of advancement criteria also tend to differ. For example, response time (speed) may be important for a multiple-choice format conjugation activity, but may not be for an open-ended sentence creation activity. The instructional designer also specifies the cutoff criterion for each element designated as important shown at 720, 722, 724, and 726. For example, if both the number of correct responses in-a-row and the percent correct are important, then two numbers must be specified, such as 2 correct-in-a-row and 70% correct overall. Generally, these criterion numbers will differ for each activity. To progress beyond the current activity 740, the system may be configured such that the student must pass all of the selected criteria, not just one of them.

If found lacking in a combination of the criteria for progressing, the student's performance may be compared with the criteria for regressing 730 which is similar to the progression criteria. The number of wrong responses to an item in the current review session may, for example, be the criteria for regressing. As with the other criteria, the instructional designer controls this number. If this number is exceeded, the item will regress 760. The purpose of regressing to an easier activity is to avoid causing the underprepared student undo anxiety and frustration. The current item simply continues in the working group for further review 750 if neither the criteria for progressing nor the criteria for regressing are fulfilled.

Pool Advancement

Once it has been determined that an item should progress from the working pool, the present invention further determines the extent of pool advancement. When a student has mastered a concept associated with an item or is more familiar with a concept, the student's time is better spent studying other concepts. Therefore, the present invention measures the student's familiarity with a concept by the student's response characteristics. Any of the factors used to determine whether an item should progress can be used to determine the extent of pool advancement. Other factors can also be used. Typically, in the preferred embodiment, the percentage of correct responses, the time taken for the first response, if correct, in relation to the student's dynamic average response time are used to determine the extent of pool advancement. The dynamic average response time is a variable calculated by the present invention for use in evaluating a student's comprehension level.

Dynamic Average Response Time

Figure 5:
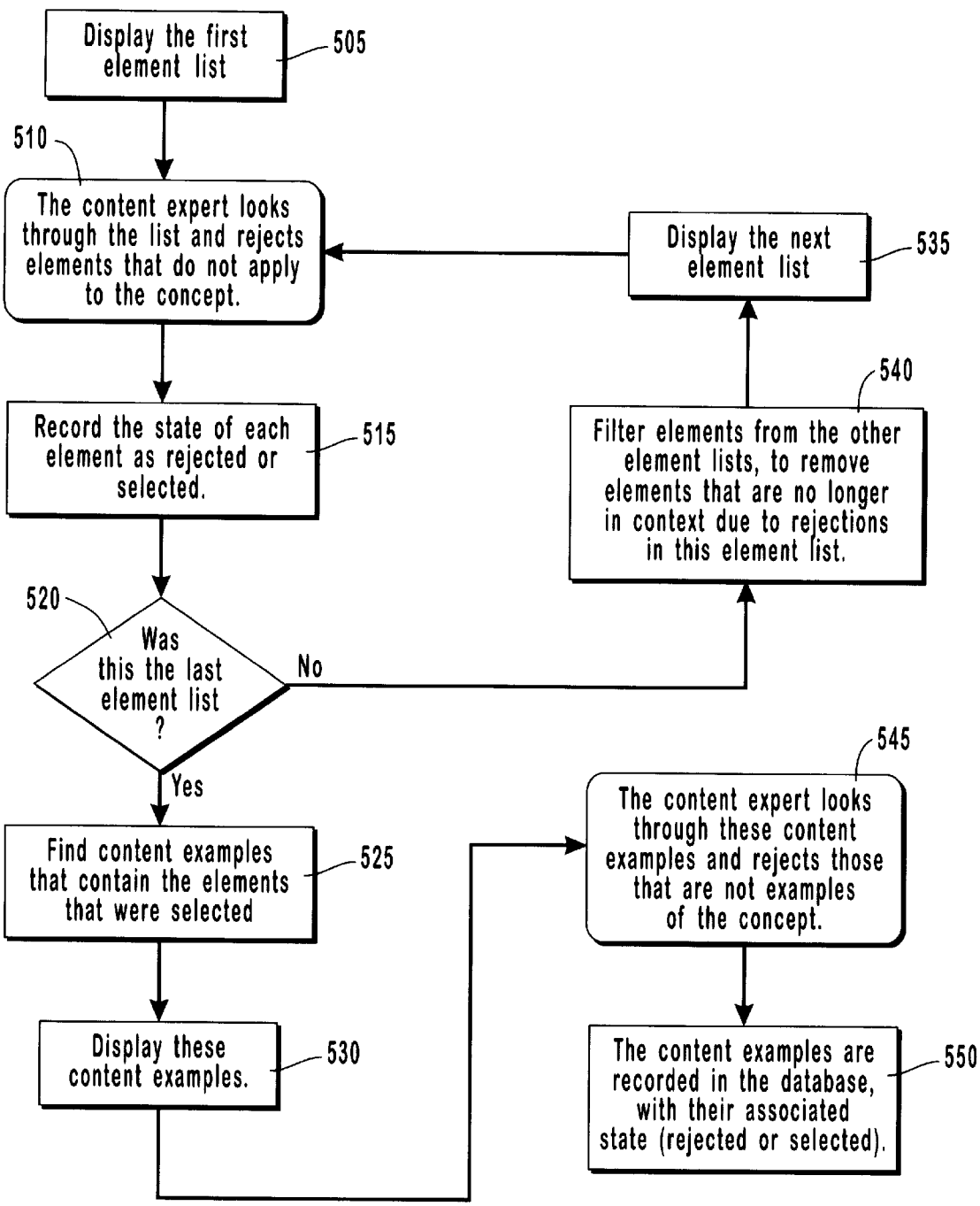
FIG. 5 is a flow diagram showing the steps involved in refining element lists within the concept tagging system. The steps in FIG. 5 are performed within blocks 340 and 350 of FIG. 3.
Figure 8:
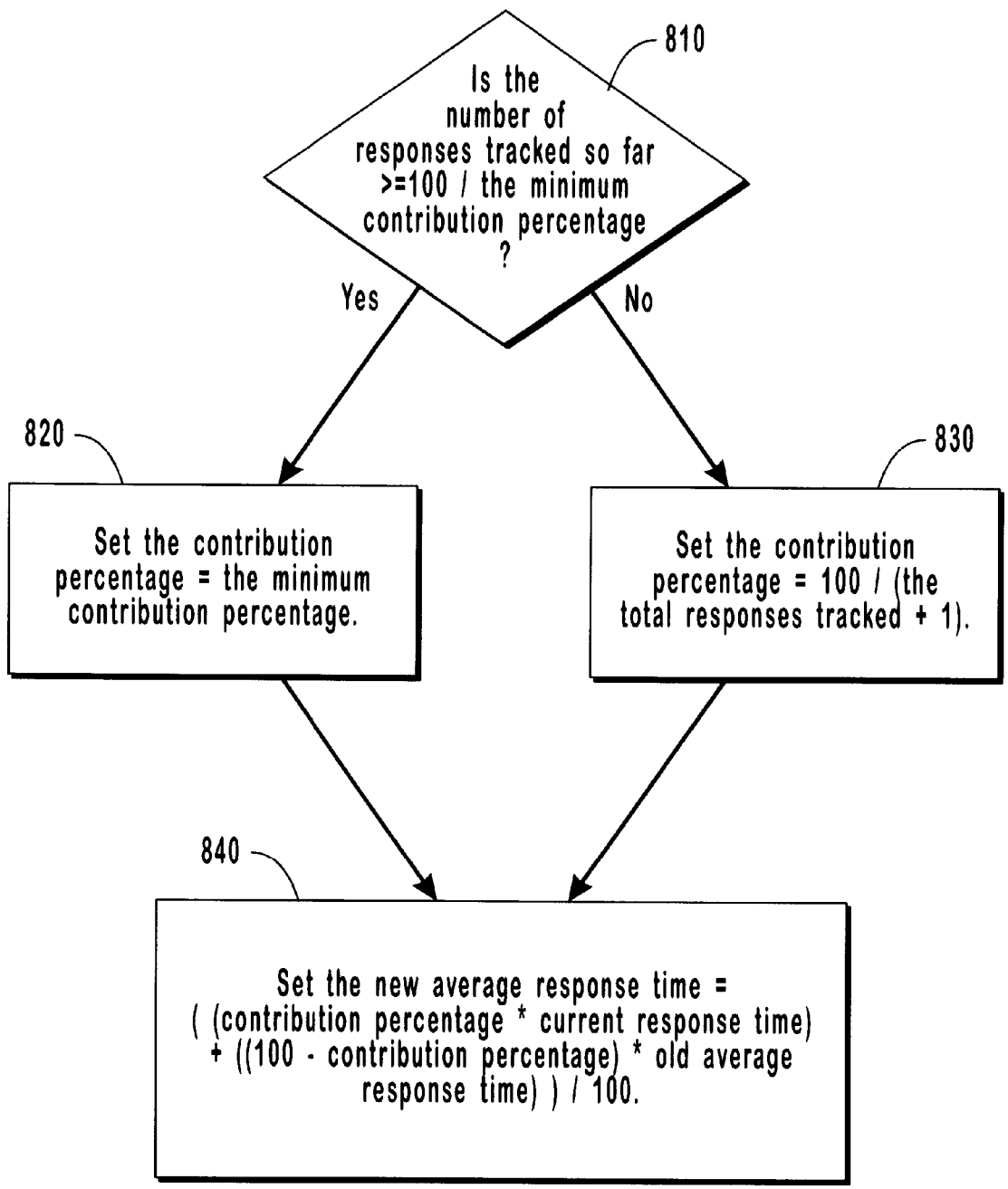
FIG. 8 demonstrates the process used to calculate the dynamic average response time of the student during exercises.

The dynamic average response time is recalculated with every correct response. Each student has a unique dynamic average response time for each item type. The process by which the dynamic average response time is calculated is shown in FIG. 8. Each student starts out with an initial average response time for each activity, as specified by the instructional designer. Initially the total number of responses tracked is zero. With each new correct response, the average response time is recalculated, and the number of responses tracked increments. After many responses are taken into account, the response time average tends to stabilize. In order to control how quickly the average can change after it stabilizes, the instructional designer specifies a minimum contribution percentage. For example, a vocabulary multiple-choice activity may have a minimum contribution percentage of 1%. This means that with each new correct response within this activity, the new average is 99% the old average response time and 1% the current response time. As shown in FIG. 5, the present invention first determines whether the number of responses is greater than or equal to the quotient of 100 divided by the minimum contribution percentage 810. If the number of responses does not yet equal this value the contribution percentage will be set to the value of 100 divided by the sum of the total responses tracked and one 830. If the total number of responses is greater than or equal to the quotient calculated at 810 the contribution percentage will be set to a value equal to the minimum contribution percentage 820. The new average response time will then be calculated as the sum of two products—the contribution percentage times the current response time, plus 100 minus the contribution percentage times the old average response time—divided by 100 (see equation, FIG. 8) 840.

This technique of calculating a dynamic average response time is effective because: (1) it converges quickly to the individual student's response time initially, and then changes more slowly as information about the student's response time is acquired, and (2) even after many response times have been averaged, new response times hold some weight instead of becoming infinitely small, so that the calculated response time continues to converge nicely to the student's developing response time.

Real-Time Response Evaluation for Pool Progression

Figure 9:
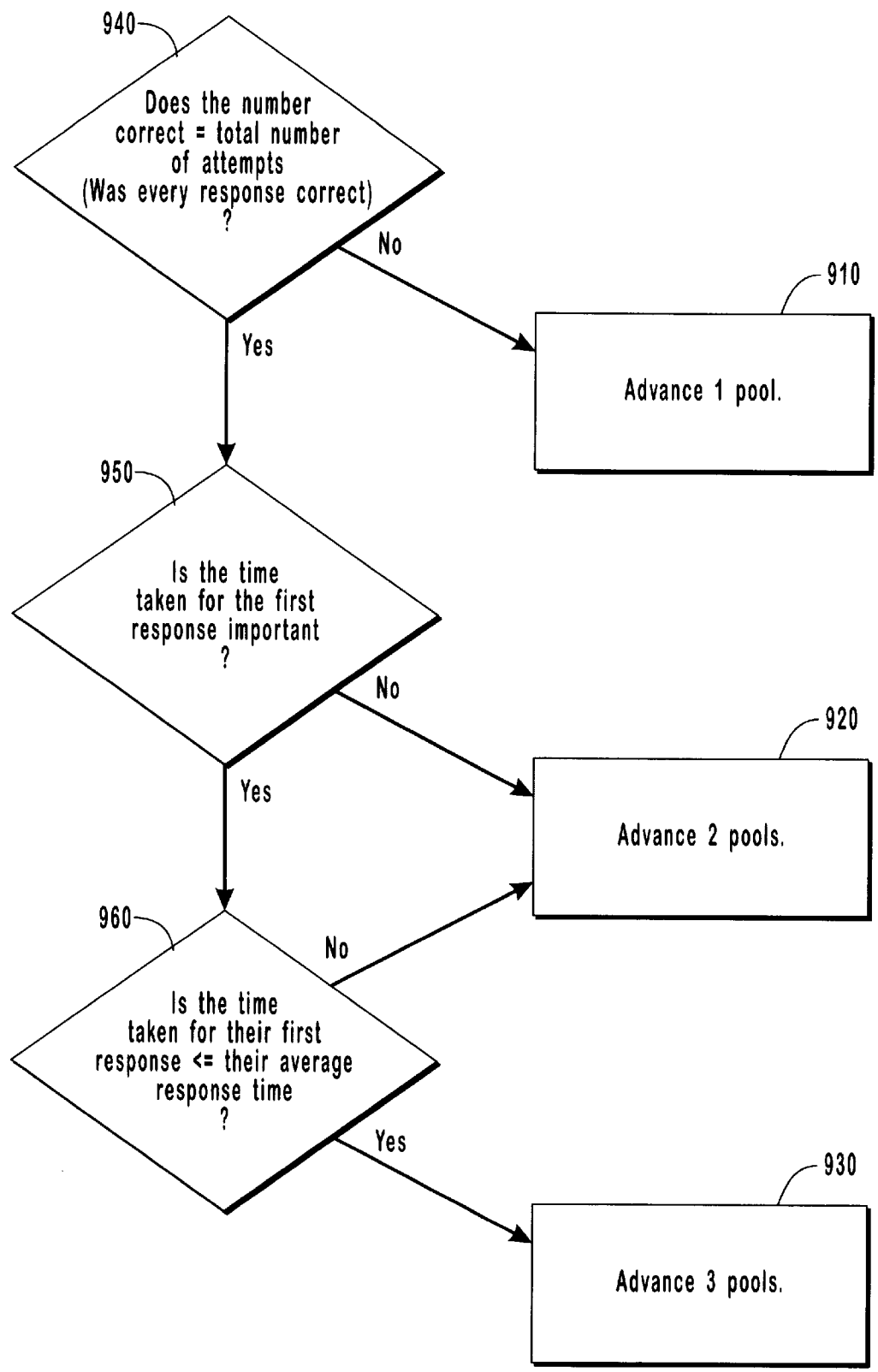
FIG. 9 demonstrates the real time response evaluation process used by the present invention to determine the extent of advancement of an item as it progresses from the working group.

Using the above noted response criteria, the present invention determines the student's level of comprehension and familiarity with a concept and the associated extent of pool progression of a particular item using a "real-time response evaluation" procedure as illustrated in FIG. 9. The systems and methods of the present invention first determine whether all of the student's responses were correct 940. If not the item will advance only one pool 910. If all responses were correct the item will advance at least two pools 920. If the instructional designer has indicated that the time taken for the first response is important, 950 then a comparison of the student's first response time and the student's dynamic average response time as calculated according to FIG. 5 is performed 960. If the student's first response time is greater than the dynamic average response time, the item will advance two pools. If the student's first response time is less than the dynamic average response time, the item will advance three pools. This is the default procedure, and has been found to work well with language training applications, however the instructional designer may specify other criteria for pool advancement for each activity and each item type.

Working Group Dynamics

To further illustrate the progression of items through the pool system and the dynamics of the working group, FIG. 10 shows a working group operating with three items. Questions about each item are presented to the student in a random sequence, so that the student cannot anticipate which question will come next. This random ordering encourages the student to pay close attention to each item in the working group, since the next question could require knowledge of any item. Moreover, if questions always followed a fixed sequence, the student would inadvertently learn to depend on the sequence itself in order to remember the correct response. This problem is prevented by random ordering. The items in the working group are reshuffled after asking one question for each item. This pattern of reshuffling is illustrated in FIG. 10 after questions 3 and 6. Notice that upon filling the working group, the order of questions is ACB. After shuffling, the sequence of the next cycle is BDA. Then another shuffle occurs, resulting in the sequence DBA. Cycling through all the items in the working group in this manner ensures that all items are given equal opportunity to be presented throughout the review session.

FIG. 10 also illustrates the dynamic nature of pool progression wherein item C leaves the working group being replaced by item D when question 2 (about item C) was answered with a fast and correct response. After an incorrect response to question 3 (about item B), item B stays within the working group. After question 3 the working group is exhausted and is therefore reshuffled before further questioning. Question 4 (about item B) is also answered incorrectly so item B again remains in the working group. Question 5 (about item D) is then asked and receives a slow but correct response causing it to remain in the working group. Question 6 (about item A) also receives a slow and correct response and A stays in the working group after which the working group is again exhausted and reshuffled. Question 7 is posed and receives a second correct and slow response which causes item D to progress from the working group either because the number correct is now at or above the minimum or the number correct-in-a-row is at or above the minimum number. Question 8, the third question about item B, is answered incorrectly demonstrating the student's lack of comprehension of the concept related to item B. Item B, therefore, regresses, leaving the working group, to the review pool associated with the next easiest activity. Question 9 (about item A) receives a correct and slow response causing it to leave the working group, however, it advances only one pool because question 1 regarding item A was previously answered incorrectly. As each item progresses from the working group, another item takes its place from the list of items ready for that activity.

The total number of questions about a particular item in a review session depends on how well the student responds to the questions. In FIG. 10, for example, the student responds quickly and correctly to item C on the first attempt, which means that no more questions will be asked about item C in the current session (see question 2). It will appear three days later in another review session, with a more advanced activity. The student struggles with item B, on the other hand, answering incorrectly three times. The third wrong response causes item B to leave the working group and regress to a review pool associated with an easier activity (see question 8).

FIG. 6 further demonstrates the dynamic progression and advancement in the pool system and the application of systematically-spaced review to learning items A, B, C and D. Items which would replace these items as they progress from the working group are not shown to simplify the diagram. On day 1, all items are studied in new pool 1, making them available for review pool 1 after a one-day delay. On day 2, all items are studied in review pool 1, but this time the student responds especially well to the questions involving item C. This results in item C jumping from review pool 1 to review pool 3, entirely skipping review pool 2. Notice that this also means that item C is delayed 2 days instead of 1. The instructional principles that suggest lengthening the delay are: (1) when the student appears to know an item particularly well, he/she will probably remember it longer than other items, and (2) less time should be spent on items that are easy for the student, to allow more time for challenging items.

Items A and D also progress from review pool 1, but only advance to the next pool. Item B, however, remains in the same pool without progression or regression and will be available for the same activity the next day.

On day 3, Items A and D are available in review pool 2 while item B is available in review pool 1. Higher review pool numbers typically reflect more advanced, progressively difficult activities so items A and D may be reviewed in a way so as to increase the student's understanding of the associated concepts beyond the level in review pool 1 while item B will be presented in an easier activity to instill a basic knowledge in the student. As reflected in FIG. 6, the student responds positively to items A and D advancing them by two pools while item B advances again by only one pool.

On day 4, only items B and C will be available. Item B will be available in review pool 2 and item C will again be available, after its one day delay, in review pool 3 where it will typically be presented in a more advanced activity than that of review pool 2. Some questions regarding item C are answered correctly such that it advances 2 pools and some of the questions regarding item B are answered correctly such that it advances one pool.

On day 5, item B is available, now in review pool 3, and items A and D are available in review pool 4. This time item B advances one pool as the student continues to be challenged by its associated concept, item D fails to progress and remains in the same pool due to poor student response, and item A advances two pools giving the student a one day break from that concept on the following day.

On day 6, the question regarding item C is answered quickly and correctly and item C advances directly to the test pool where, after a 3 day delay, it will be accessible to the student for final testing. Item B advances one pool and item D advances two pools.

On day 7, item A is available again and after a positive student response advances to the test pool. Item B, still challenging the student, regresses back to pool 4 (the pool it occupied the previous day) where it becomes immediately available the same day in a less challenging activity.

On the following days similar progression takes place until all items progress to the test pool. The three day delay before testing is crucial to ensuring that the student has committed the learned information to medium or long term memory.

Integrated Concept/Student Adaptation

Figure 11:
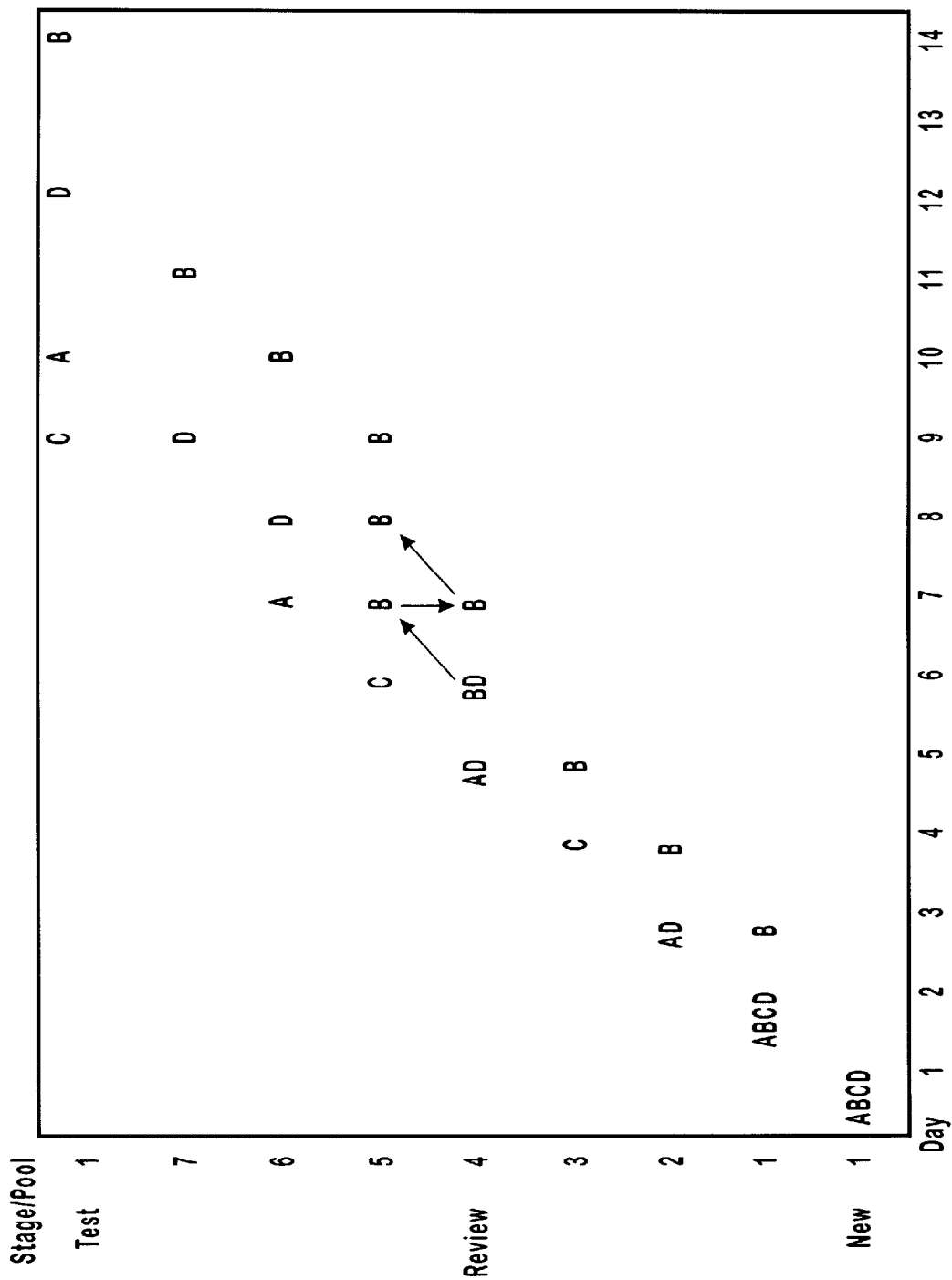
FIG. 11 is a graph showing the independent progression of items through pools.

Another feature of the present invention is its ability to automatically tailor learning sessions to the individual student. This is referred to as integrated concept/student adaptation. Individualized learning has more potential for learning efficiency than group-paced learning. With the pool learning system, each student learns each individual item at his/her own pace, for that particular item. This process avoids static lessons with their associated boredom and inefficiency. For example one student might master items X and Y quickly and item Z slowly, while another student might master item Y quickly, and items X and Z slowly. FIG. 11 also illustrates how learning progress varies for a student learning items A, B, C and D. The hypothetical student represented in FIG. 11 has advanced item B from the new stage to the test stage after 14 days, whereas item C is ready for testing after 9 days. This figure also illustrates the fact that more time is spent learning items that are more challenging to the student. For example, item B is encountered 12 different times before the test, while item C is only encountered 4 times before the test.

Systematically Spaced Review

Some students employ a study strategy wherein they study intensely just prior to testing in order to commit a great deal of information to short term memory immediately before the test. This technique is called cramming and leads to lower retention when the short term memory period expires. The pool learning system of the present invention ensures that items are reviewed periodically over several days or weeks. This is accomplished by putting a delay between each pool. Typically a one-day delay occurs between each review pool. A several-day delay occurs just before being tested on an item. Without these delays in force, a student might choose to study and progress an item from the new stage to the test stage in a single day resulting in short term memory retention only. The present invention, therefore, employs systematically spaced review and testing to ensure that items should always be in mid- or long-term memory by the time they pass the test.

Dynamic Menu System

In a learning session, the student must choose from a menu of currently available programs. For example, in a language training example such as the preferred embodiment, the student may have up to three program areas to choose from for grammar, vocabulary or phrases. All three program areas potentially have new, review, and test components yielding a maximum of nine menu choices for learning items with the pool learning system. These would be New Grammar, Review Grammar, Test Grammar, New Vocabulary, Review Vocabulary, Test Vocabulary, New Phrases, Review Phrases, and Test Phrases. Only programs for which a sufficient number of learning items are available for study are included on the dynamic menu, therefore all choices may not be displayed at any given time. Once the student has selected a program in the menu, the program begins an ongoing process of choosing which activities to show to the student. For the new and test programs, this may be straightforward. For the new programs, the activity chosen may follow a sequence fixed by the instructional designer or the student may be given a choice among a selection of introductory activities. For the test programs, the activity used to test a given item is typically assigned by the instructional designer or content expert. The selection of review activities is more complex and arrives at a sequence, determined by the present invention, which maximizes the student's learning efficiency using student-specific activity sequencing.

Student-Specific Activity Sequencing

Figure 12:
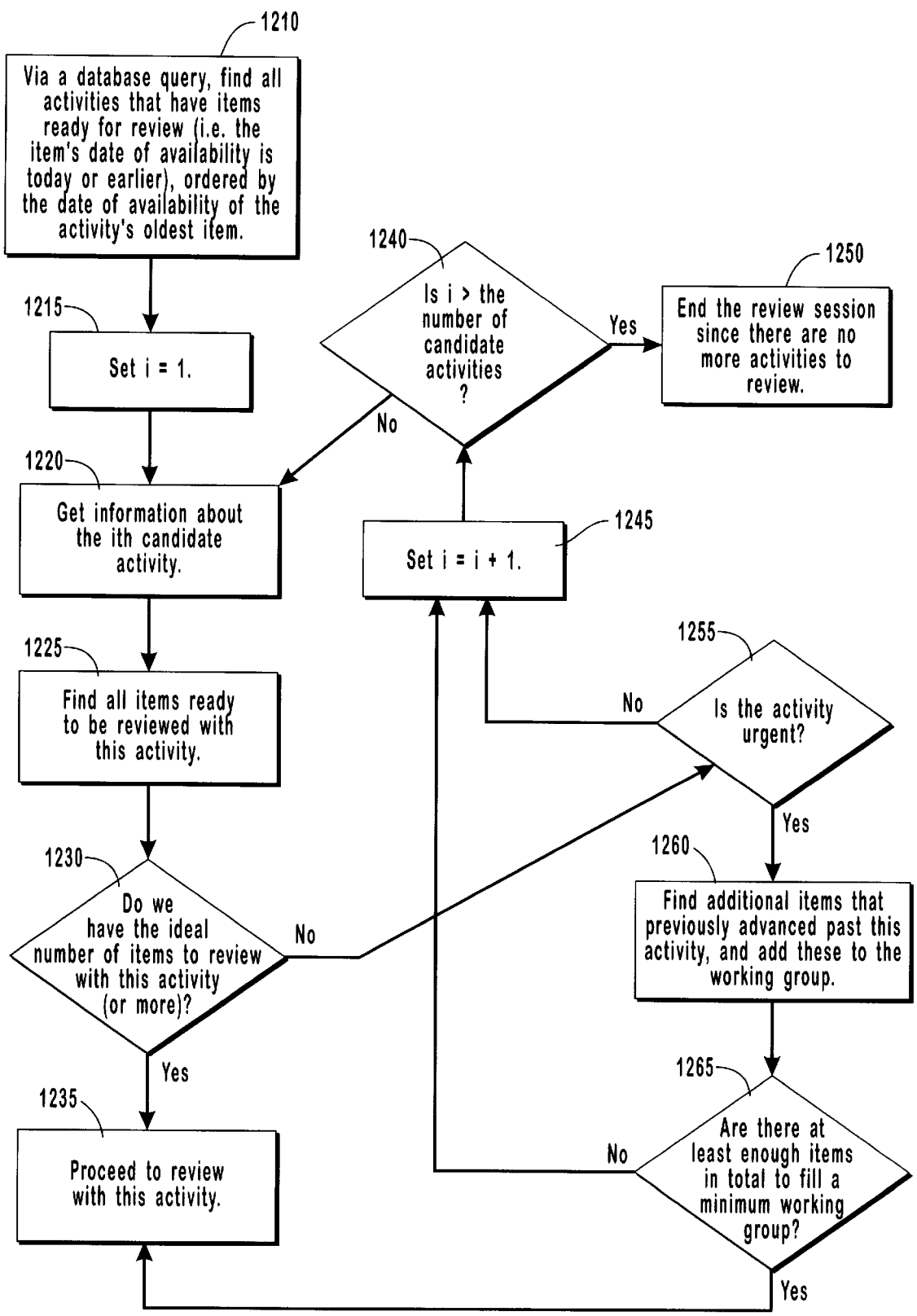
FIG. 12 is a flow chart showing the activity eligibility analysis used by the present invention for choosing the next activity to be presented to a student during review exercises using student-specific activity sequencing.

FIG. 12 shows the method by which the present invention selects review activities. To determine the next review activity, the present invention queries the user's database to find the set of activities for which there are any items ready for review 1210. These activities are ordered by the date of availability. For example, activities with items which have been available the longest are given first priority. An item becomes available when it enters a pool that is assigned to a given activity and the date previously targeted for study of that item has passed. For example, when a student responds correctly to a question in the new stage, the item is advanced to the first pool in the review stage where it waits until the activity assigned to that pool is used. Once these activities are identified and ordered the system and method of the present invention set an incrementing variable "i" 1215 to the value of one to keep track of activity priority. This variable will be incremented to 2 and so on as activities are rejected 1245. The new system and methods of the present invention then begin an activity eligibility analysis by querying the database for information on the activity with first priority. This information includes the ideal number of items to use with the activity, the minimum number of items to be used with the activity as well as other information designated by the instructional designer 1220. The invention then finds the number of items available for use with the activity 1225 and checks to see if the ideal number of items is available 1230. If the ideal number of items is available the activity will be presented without further analysis 1235, if the ideal number is not available a further check is made to see if the activity is urgent 1255. The urgency limit can be defined by the instructional designer to be a given amount of time that the item has been available. If an item has been available for a period of time in excess of the urgency limit its activity becomes urgent. When an activity is urgent the present invention will search for additional items that have previously advanced past its pool and add those items to its pool 1260. The present invention will then check to see if the minimum number of items is available to present the activity 1265. If the number of items available for the activity is less than the minimum number required (a number specified by the content expert), the program will increment to the activity with the next highest priority 1240 and begin the activity eligibility analysis anew 1220. When all activities with items ready for review have been analyzed, the session is ended 1250. This cycle continues until a review activity is chosen, or until the set of reviewable activities is exhausted.

Once an activity is chosen for review, the student continues to study with it until an ideal number of items have advanced out of the working group or the current pool is exhausted. Then another activity is chosen using the process in FIG. 12, as explained above.

Student-Specific Concept Filtering

Figure 13:
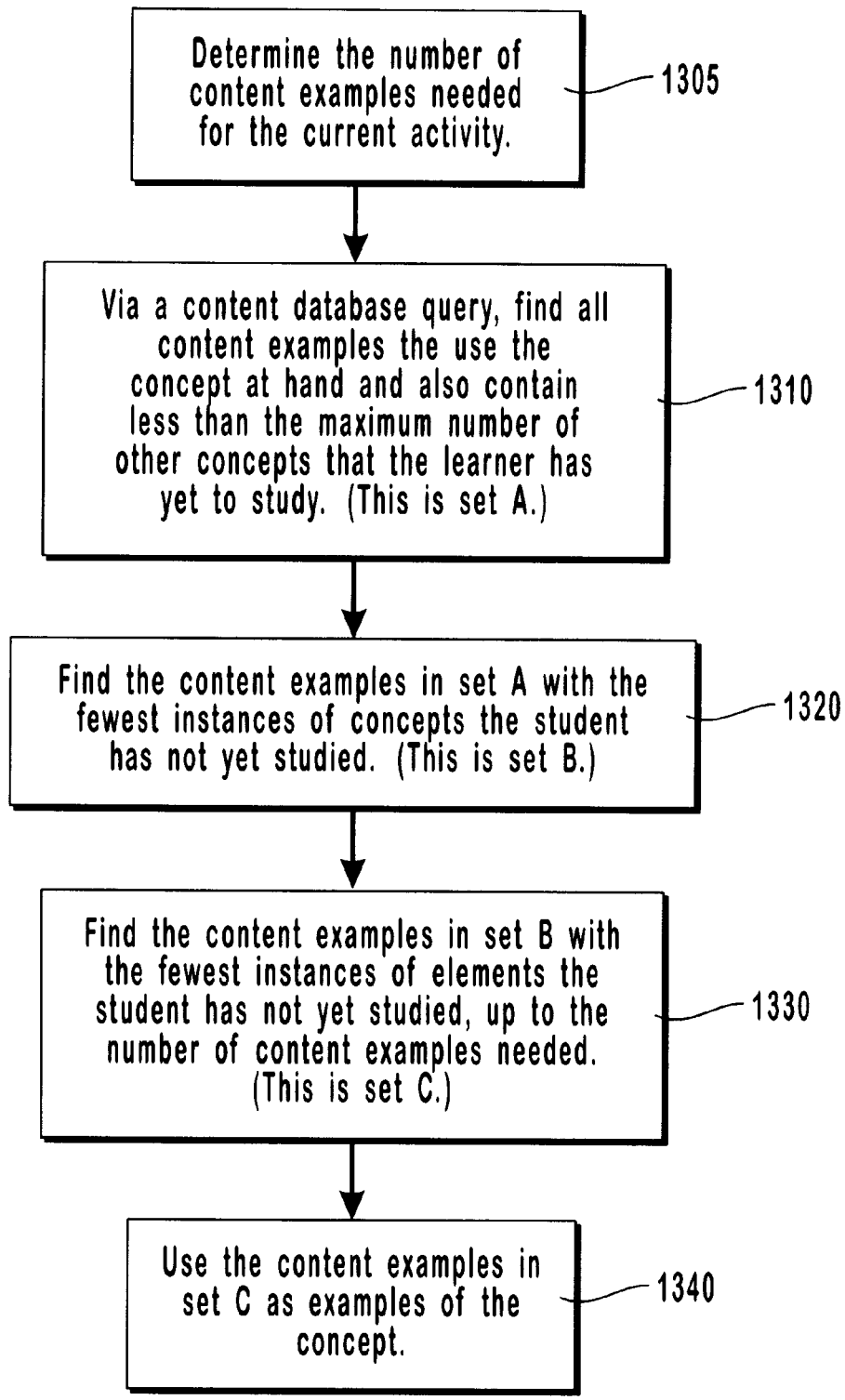
FIG. 13 shows the steps of the student-specific concept filtering process used by the present invention to determine which content examples of the learning item will be used for a current activity.

Another feature of the present invention is student-specific concept filtering, the ability to select database content based on an individual student's relative progress in relation to the difficulty of concepts contained in the database elements. Concepts and principles are presented to the student in order of increasing difficulty and complexity. As a student is introduced to new concepts, the program keeps track of the concepts to which the student is exposed. The program can then limit the content to which a student is exposed in the various activities to concepts that are at or near the student's level of progress. This feature may best be demonstrated in another language application example as it is used in the preferred embodiment. When a user studies the Japanese grammar principle Bte+kudasai the program performs a search based on that grammar principle and finds example sentences that are tagged as examples of that principle via the concept tagging process described above. However, some of those sample sentences may not be appropriate for the user, that is, they may contain other complicated principles that will overwhelm and confuse the user. Instead of showing all the candidate sentences, the program will filter out the complicated examples by comparing the grammar principles and vocabulary contained in the sentences with the grammar principles and vocabulary previously studied by the learner. Through this method the sample sentences are tailored to each individual's prior experience and the learner is challenged but not overwhelmed. The details and logic of this process are shown in FIG. 13.

Once all instances of grammar in the sentences have been recorded in a database using the concept tagging process, effective example sentences (content examples) can be chosen for grammar activities. Rather than just choose any example sentence that uses the grammar principle being taught, sentences are selected which are most likely to be understood by the student.

Once the present invention has determined the number of example sentences needed for the current activity 1305, all sentences that contain an example of the selected grammar principle and which do not have less than the maximum number of grammar principles that the student has not yet studied are drawn out of the content database 1310 for use. Then, the grammar principles contained in those sentences are compared to a list of grammar principles already studied by the student to determine the number of grammar principles the sentence contains that the student has not yet studied 1320. A set of those sentences with the least instances of grammar not studied by the student is compiled and saved for the next filtering step. In the next step, the vocabulary contained in the filtered sentences is then compared with the vocabulary studied by the student to determine which sentences contain the most instances of vocabulary not yet studied by the student 1330. The sentences coming out of this step with the fewest instances of vocabulary not yet studied by the student are then used as example content in an activity addressing the grammar principle being introduced or reviewed 1340.

The instructional designer can control the balance of grammar filtering versus vocabulary filtering by specifying the relative size of sets B and C. If the ratio is set to 2, half of the sentences in set B will be chosen for set C, based on how much not-yet-learned vocabulary the sentences contain. If the ratio is set to 4, then only one-fourth of the sentences in B would be allowed in C.

Create Module

Another novel aspect of the present invention is the Create module. By using the Create module of the TAL software the learner has an opportunity to apply newly learned skills to a whole, creative activity. Users can make print materials, access and manipulate the text from the database, and make custom audio recordings from the audio files stored on the computer. The user has the ability to create customized study materials from the elements in the present invention's databases. Students can create textual study materials that can be imported into a word processor for manipulation and exercise or print directly from the program to create memorization lists or other materials. Each of the database elements also has a corresponding audio file. The user can listen to the audio files directly from the computer or arrange the files to make an audio recording of their selection.

Interactive Phrase Memorization

Yet another feature of the present invention is a group of activities designed to help the student memorize database elements or learning items. This feature is extremely useful in learning new terminology for a new profession such as the medical or nursing fields as well as learning phrases of a new language. To produce speech in a target language quickly, a student memorizes useful sentence patterns and common expressions. Several activities within the present invention help the student to memorize these phrases efficiently and comprise the interactive phrase memorization system. These activities include "order parts" and "progressive typing." All interactive phrase memorization activities are spaced and coordinated via the pool learning system described previously. Although these activities are applied to learning a second language in the preferred embodiment, the same activities could be applied in any situation that involves memorization of sentences, sequences of items or related or associated terms. Also note that these activities apply to the memorization of long passages of text as well as short sentence fragments.

Order Parts Activity

Figure 14:
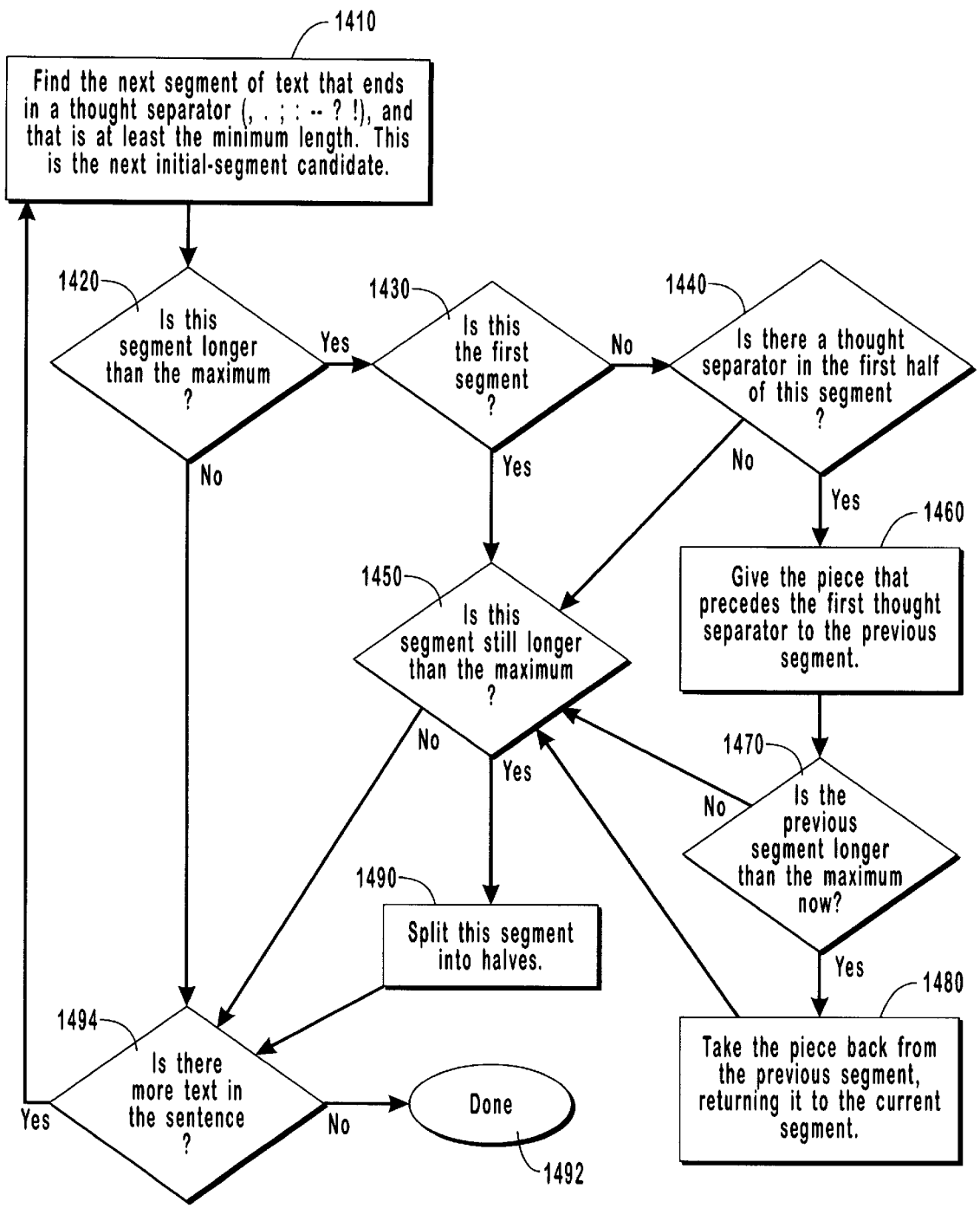
FIG. 14 is a flow diagram which discloses the logic used by the present invention to divide phrases into initial segments which can be assembled into independently meaningful parts.

The order parts activity requires the student to take a scrambled list of words of a sentence or phrase parts, and rearrange them to reconstruct the original word structure. The scrambled list may be in any order that does not hint at the original order of the sentence or phrase. An alphabetical order may be effective for most applications. The number of words in each part decreases until the student can recreate the sentence one word at a time. To prepare the first order-parts exercise for a given sentence, the sentence is broken up into initial parts via the process shown in FIG. 14.

The purpose of this process is to divide the sentence into phrase parts that are individually meaningful. The process begins by dividing the sentence or phrase into "initial segment candidates" (ISC's) which must be at least a minimum character length and must be divided by thought separators such as spaces, dashes, punctuation symbols, etc 1410. After an ISC is selected in this manner from a given sentence, it is evaluated to see if it exceeds a maximum length 1420. If is does not exceed the maximum length it becomes a segment and the next ISC is found and evaluated, if it exceeds the maximum length it will undergo further analysis and modification. If the ISC exceeds the maximum length and is the first segment of a sentence or phrase 1430 it will be split in half before proceeding to the next ISC; otherwise it is further checked for a thought separator in the first half of the ISC 1440. If it does not have a thought separator in the first half, the ISC will be split in half and the next ISC will be evaluated 1490. If the ISC has a thought separator in the first half, the ISC is divided at the thought separator and the portion preceding the thought separator is tentatively added to the previous segment 1460 after which the previous segment is again evaluated to see if it exceeds the maximum length with its newly added portion 1470. If the previous segment now exceeds the maximum length, the added portion will be removed and given back to the current ISC 1480. The current ISC will, then, be split in half 1490. If the previous segment does not exceed the maximum length with its newly added portion, it will retain the newly added portion and the current, newly shortened, ISC will be rechecked for length 1450, if it still exceeds the maximum length it will be split in half 1490 otherwise it will become the next segment. This process is repeated until no text is left in the sentence 1494.

After this segment division process any punctuation or capitalization at the beginning or end of each segment is removed. This makes ordering the parts more challenging, since otherwise the student could identify the first part by its capitalization and the last part by its punctuation, such as a period. The parts are arranged in a scrambled list and presented to the student for sequencing. In the preferred embodiment, the scrambled list takes the form of alphabetical ordering of parts. The native language translation or explanation of the phrase is given, and the student is invited to reconstruct the equivalent target subject matter word structure by clicking on the listed parts in the right order. If the student succeeds, then the next exercise is made more challenging by subdividing the initial parts. If the student does not succeed, then the next exercise is made easier by combining the initial parts to form larger parts.

Figure 15:
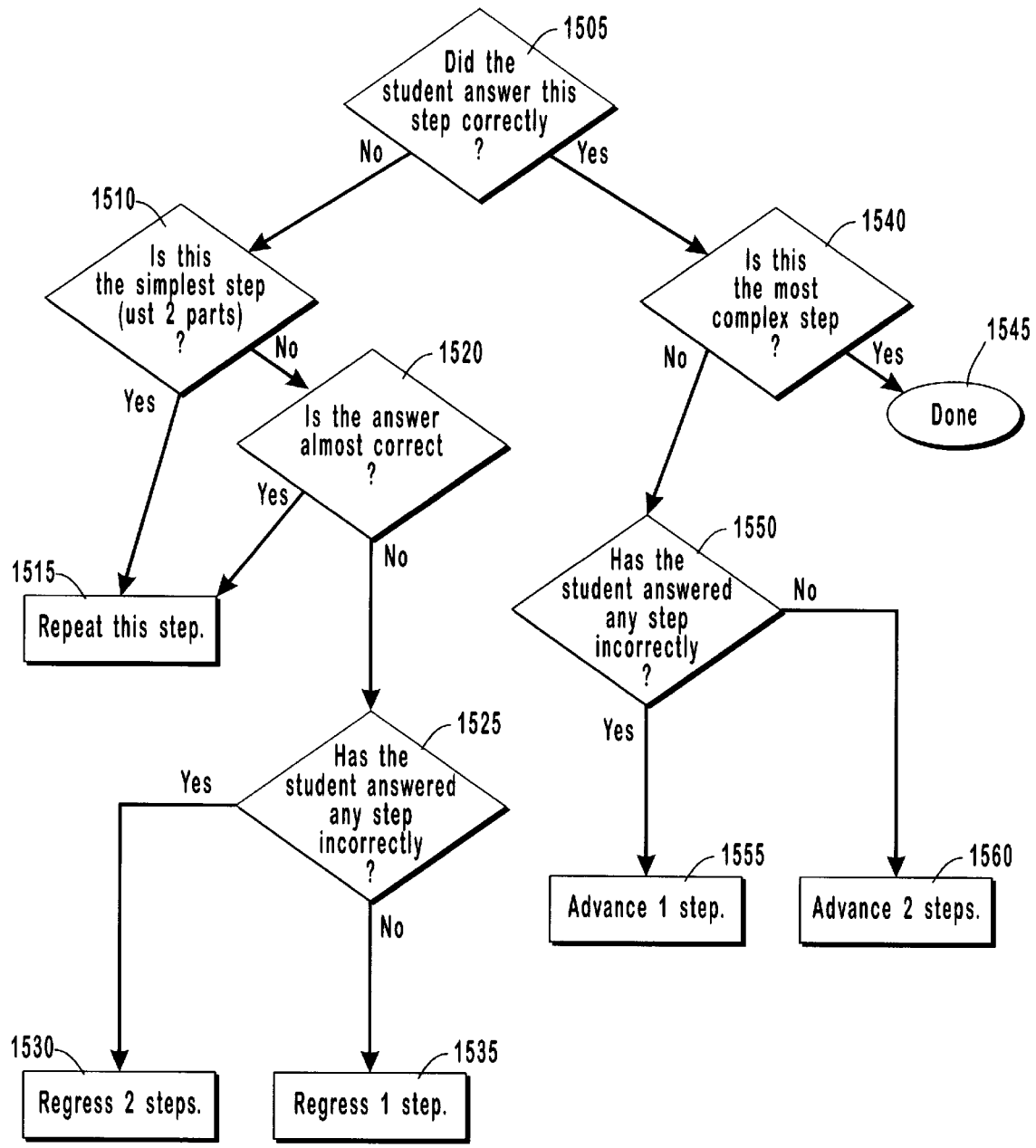
FIG. 15 is a flow diagram demonstrating the logic used to determine how difficult to make the next question for the ordering parts activity.

This process of subdividing or combining occurs after every success or failure. FIG. 15 shows the process for determining how difficult or easy to make the next question. When a student answers a step correctly 1505, the present invention checks to see if the student has already progressed to the most complex step (where the content example has been divided into individual words and distractors have been added) 1540. If this final step has been reached the activity is done 1545, otherwise it is next determined if the student has answered any step in the activity incorrectly 1550. If any step has been answered incorrectly the activity advances one step 1555, if all steps have been answered correctly the activity will advance two steps 1560. When a step is answered incorrectly 1505, the present invention determines whether the student has already relapsed to the simplest step of the activity where the content example is divided into only two parts 1510. If the student is already at the simplest step, the step is simply repeated 1515 until it is answered correctly. Otherwise, the answer is evaluated to determine if it was almost correct 1520, and, if so, the step will be repeated 1515. Whether a response is "almost correct" is determined by the percentage of words that are placed in the correct order. The instructional designer may change this percentage to fit the circumstances. In the preferred embodiment a percentage of 85% is commonly used for language training. If the answer is not almost correct, the present invention next determines if the student has answered any previous steps in the activity incorrectly 1525. If previous steps have been answered incorrectly the activity will regress two steps 1530. If all previous steps were answered correctly the activity will regress only one step 1535.

If the student continues to struggle with every question, the simplest case will ultimately be reached, which merely requires the student to order two parts, the first and last halves of the phrase. After answering incorrectly, the student is shown the correct answer, and the discrepancies in his/her answer are highlighted. With every question, the phrase becomes more entrenched in the student's memory. Soon the student is able to respond correctly to the most difficult order-parts question, which requires the student to find the individual words of the phrase among a list of distractors. Typically, the steps will be made progressively simpler by recursively doubling the size of the parts. In other words, the number of ISC's in each part is 1, 2, 4, 8, and so on up until there are only two parts to be sequenced. To make the steps progressively more difficult, the ISC's are divided into fractions $\frac{1}{2}$, $\frac{1}{3}$, $\frac{1}{4}$, $\frac{1}{6}$, $\frac{1}{8}$, $\frac{1}{12}$, $\frac{1}{16}$, $\frac{1}{24}$, $\frac{1}{32}$, and so on until each part only contains one word. The final step adds distractors to the list of single-word parts, so that the student is required to recognize which words are in the phrase, as well as how they are ordered.

The order parts activity is effective because it helps the student to link phrase fragments in the right sequence. Linking phrase or sentence fragments is essential to memorizing verbal sequences. By adapting to the student's ability, the activity challenges but does not overwhelm the student. For this reason, students that find memorization difficult will especially benefit from the order parts activity. The simplest question only requires the student to recall the sequence of two items, the two halves of the phrase. Even the struggling learner will have little trouble answering this question correctly. As the student succeeds at one step, the next step requires them to recall more and more sequential links. When the student cannot recall one of the sequential links, he/she may still be able to arrive at the correct answer by comparing each part to see which one best follows the previous part grammatically or semantically. By doing this, the student partially relies on knowledge other than memory of the phrase, however the mental effort expended by considering the candidates will contribute to making the sentence parts more memorable.

The pool learning system coordinates all the phrase memorization activities allowing several phrases to be reviewed with the order parts activity at once. This makes remembering the phrase from one question to the next more challenging, since the student must juggle several in his/her mind simultaneously. The order parts activity may also span several days for a given phrase to further challenge the student.

Progressive Typing Activity

Another novel memorization and learning activity of the present invention is the progressive-typing activity. It is more challenging than the order-parts activity, since it requires the student to produce the phrase character by character. Ultimately, this activity teaches the student to recall the entire phrase verbatim without any hints other than the native language translation or explanation of the term. What makes this activity noteworthy, however, is its ability to carefully work up to the ultimate step by generating questions that are individualized to the student's ability to recall the given phrase.

The present invention adapts each progressive typing question to the individual learner thereby enhancing the learning experience. Before reaching this activity, the student has become quite familiar with the phrase via the other memorization activities, such as the order-parts activity. This preparation is vital to prevent the progressive-typing activity from being too difficult. The very first step of the progressive-typing activity is called the "challenge" step. The "challenge" step invites the student to show how well he/she can recall the phrase, by typing it without any hints other than the native language translation. This step is necessary to assess which parts of the phrase the student has already learned, so that subsequent steps can be tailored to his/her ability. The student is not expected to recall the entire phrase at this point—the question is presented in such as way as to appear not as a test, but as a challenge to see what they already know. After this attempt, and every subsequent attempt, the student is shown the correct answer and the parts he/she missed are highlighted.

For the second step, the words that the student got right are pre-filled in the answer box, so that they do not need to be retyped. Also, for each word that was missed, a few characters are revealed as hints, and the remaining characters are represented by dashes. For example, seeing the first few characters or the last few characters of a missed word is a powerful aid for recalling the entire word. The student is also helped by seeing the number of letters in each word. The number of hint characters revealed depends on the total number of words missed. For foreign language training, one hint character for every five words missed has proven to be an effective ratio, however, this number can be adjusted for other applications. Accordingly, if two words were missed, then the first character of both is revealed. If ten words were missed, then the first two characters of each of the ten words are shown, and so on.

After making the second attempt, the hints are decreased or increased for subsequent steps according to the following pattern. If a particular word is missed again despite the hints, then the number of hint characters is increased by the number of words missed this time divided by five. Eventually the number of hint characters is constrained by the length of the word. At most, all letters in the word except the last letter are revealed. If the student correctly recalls a word that was previously missed, then the number of hint characters for that word is halved at the next step. Eventually no hint characters will be given for that word. This process continues until the student can produce the phrase without any hint characters showing.

Individualized Automated Student Monitoring and Reporting

Additionally, the present invention includes a method for generating customized reports regarding the progress and study history of each student. Teachers can access computer generated student reports which give information about how the student is spending her time, which topics are mastered, and which topics she finds difficult. Teachers and administrators can follow up by giving appropriate feedback and guidance. As a student studies, the present invention monitors and records the time spent on each activity, items studied, items mastered, amount of idle time, and other variables. This data is recorded and reported in a format which may be configured by the instructional designer. A sample report is included below.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

Sample Report

John R. Doe

Report covers 12 sessions and 7 days (Mar. 24, 1997 7:04:59 AM to Mar. 31, 1997 1:34:36 PM)

Tasks

Average time spent since last report: 38 minutes/session.

Total worked on: 41 tasks.

Phrases

Average time spent since last report: 6 minutes/session.

Mastered since last report: 6 phrases.

List of phrases mastered since last report:

Ten no OtĀsama.

Nanpaæji desu ka?

Hai, wakarimasu.

Konnichiwa.

O-genki desu ka?

Sayonara.

Total mastered: 6 phrases.

Grammar

Average time spent since last report: 22 minutes/session.

Mastered since last report: 1 principles.

Total mastered: 12 principles.

Vocabulary

Average time spent since last report: 7 minutes/session.

Mastered since last report: 45 words.

Total mastered: 252 words.

Listening Comprehension

Average time spent since last report: 0 minutes/session.

Scores on tests taken so far: 7/19 4/19 7/18 8/13 7/19 6/19. Create

Average time spent since last report: 0 minutes/session. Summary

Total of average time spent since last report: 74 minutes/session.

Portion of above total which is mostly 'idle' time: 28 minutes/session.

Percent of above total which is mostly 'idle' time: 37%

Times learner recorded with the microphone since last report: 24 recordings/session.

Number of practices with teacher since last report: 2

Total time spent in practices with teacher since last report: 19 minutes.

What is claimed is:

1. A technology assisted learning system comprising:

at least one computer comprising a visual display device, a central processing unit (CPU), one or more input devices, one or more output devices, and one or more memory portions;

said memory portion(s) comprising:

means for building and maintaining a computerized database comprised of database elements to be learned and their characteristics;

means for conducting learning activities that will access said database for learning content;

means for tagging said database elements to identify them as containing specified conceptual principles comprising a concept tagging system;

means for presenting said elements using systematically spaced review and testing in a pool learning system;

means for providing selective access to said learning activities using student specific activity sequencing;

means for providing selective access to said database elements using complexity level concept filtering;

means for providing an interactive phrase memorization process using an order parts activity;

means for providing an interactive phrase memorization process using a progressive typing activity; and, means for monitoring and reporting student progress and study history using individualized automated student monitoring and reporting.

2. The technology assisted learning system as in claim 1 wherein said computerized database elements comprise language elements.

3. A method of technology assisted learning comprising the following steps:

obtaining at least one computer comprising a visual display device, a central processing unit (CPU), one or more input devices, one or more output devices, and one or more memory portions;

said memory portion(s) having software which performs the steps of:

building and maintaining a computerized database comprised of database elements to be learned and their characteristics;

conducting learning activities that will access said database for learning content;

tagging said database elements to identify them as containing specified conceptual principles comprising a concept tagging system;

presenting said elements using systematically spaced review and testing in a pool learning system;

providing selective access to said learning activities using student specific activity sequencing;

providing selective access to said database elements using complexity level concept filtering;

providing an interactive phrase memorization process using an order parts activity;

providing an interactive phrase memorization process using a progressive typing activity; and, monitoring and reporting student progress and study history using individualized automated student monitoring and reporting.

4. The technology assisted learning system as in claim 3 wherein said computerized database elements comprise language elements.

5. A technology assisted learning system stored via storage media, the storage media comprising:

a first plurality of binary values for building and maintaining a computerized database comprised of database elements to be learned and their characteristics;

a second plurality of binary values for conducting learning activities that will access said database for learning content;

a third plurality of binary values for tagging said database elements to identify them as containing specified conceptual principles comprising a concept tagging system;

a fourth plurality of binary values for presenting said elements using systematically spaced review and testing in a pool learning system;

a fifth plurality of binary values for providing selective access to said learning activities using student specific activity sequencing;

a sixth plurality of binary values for providing selective access to said database elements using complexity level concept filtering;

a seventh plurality of binary values for providing an interactive phrase memorization process using an order parts activity;

an eighth plurality of binary values for providing an interactive phrase memorization process using a progressive typing activity; and, a ninth plurality of binary values for monitoring and reporting student progress and study history using individualized automated student monitoring and reporting.

6. The technology assisted learning system as in claim 5 wherein said computerized database elements comprise language elements.

7. A technology assisted language learning system comprising:

at least one computer comprising a visual display device, a central processing unit (CPU), one or more input devices, one or more output devices, and one or more memory portions;

said memory portion(s) comprising:

means for building and maintaining a computerized database comprised of language elements to be learned and their characteristics;

means for conducting learning activities that will access said database for learning content; and means for presenting said elements using systematically spaced review and testing in a pool learning system.

8. The technology assisted language learning system of claim 7 further comprising means for tagging said database elements to identify them as containing specified conceptual principles comprising a concept tagging system.

9. The technology assisted language learning system of claim 7 further comprising means for providing selective access to said learning activities using student specific activity sequencing.

10. The technology assisted language learning system of claim 7 further comprising means for providing selective access to said database elements using complexity level concept filtering.

11. The technology assisted language learning system of claim 7 further comprising means for providing an interactive phrase memorization process using an order parts activity.

12. The technology assisted language learning system of claim 7 further comprising means for providing an interactive phrase memorization process using a progressive typing activity.

13. The technology assisted language learning system of claim 7 further comprising means for monitoring and reporting student progress and study history using individualized automated student monitoring and reporting.

14. A method of technology assisted language learning comprising the following steps:
   obtaining at least one computer comprising a visual display device, a central processing unit (CPU), one or more input devices, one or more output devices, and one or more memory portions;
   said memory portion(s) having software which performs the steps of:
     building and maintaining a computerized database comprised of language elements to be learned and their characteristics;
     conducting learning activities that will access said database for learning content; and
     presenting said elements using systematically spaced review and testing in a pool learning system.

15. A technology assisted language learning system stored via storage media, the storage media comprising:
   a first plurality of binary values for building and maintaining a computerized database comprised of language elements to be learned and their characteristics;
   a second plurality of binary values for conducting learning activities that will access said database for learning content; and
   a fourth plurality of binary values for presenting said elements using systematically spaced review and testing in a pool learning system.

16. A technology assisted language learning system comprising:
   at least one computer comprising a visual display device, a central processing unit (CPU), one or more input devices, one or more output devices, and one or more memory portions;
   said memory portion(s) comprising:
     means for building and maintaining a computerized database comprised of language elements to be learned and their characteristics;
     means for conducting learning activities that will access said database for learning content; and
     means for tagging said database elements to identify them as containing specified conceptual principles comprising a concept tagging system.

17. A technology assisted language learning system comprising:
   at least one computer comprising a visual display device, a central processing unit (CPU), one or more input devices, one or more output devices, and one or more memory portions;
   said memory portion(s) comprising:
     means for building and maintaining a computerized database comprised of language elements to be learned and their characteristics;
     means for conducting learning activities that will access said database for learning content; and
   means for providing an interactive phrase memorization process using a progressive typing activity.

18. A technology assisted language learning system comprising:
   at least one computer comprising a visual display device, a central processing unit (CPU), one or more input devices, one or more output devices, and one or more memory portions;
   said memory portion(s) comprising:
     means for building and maintaining a computerized database comprised of language elements to be learned and their characteristics;
     means for conducting learning activities that will access said database for learning content; and
     means for providing an interactive phrase memorization process using an order parts activity.

19. A technology assisted learning system comprising:
   at least one computer comprising a visual display device, a central processing unit (CPU), one or more input devices, one or more output devices, and one or more memory portions;
   said memory portions comprising:
     software for prompting for and receiving a response from a student, the response being directed to learning one or more items;
     software for evaluating a student's level of comprehension of said items;
     software for sorting said items based on said student's level of comprehension.

20. The technology assisted learning system of claim 19 wherein said prompting and receiving are accomplished through one or more learning activities.

21. The technology assisted learning system of claim 19 wherein said evaluating is performed using a real-time response evaluation.

22. The technology assisted learning system of claim 19 wherein said sorting is accomplished through a pool learning system.

23. The technology assisted learning system of claim 19 further comprising software for re-presenting said items to said student for review and re-evaluation using a systematically spaced review.

24. A technology assisted learning system comprising:
   at least one computer comprised of a display portion, a central processing unit (CPU) portion, an input portion, an output portion, and one or more memory portions;
   said memory portion(s) comprising:
     (a) software for presenting a plurality of items to be learned;
     (b) software for evaluating a student's level of comprehension of said items;
     (c) software for sorting said items into a plurality of pools based on said student's level of comprehension;
     (d) software for reviewing said items, from each of said pools, at a frequency and a level of difficulty determined by said student's level of comprehension associated with each of said pools, said frequency being higher for a lower level of comprehension and lower for a higher level of comprehension and said level of difficulty being higher for a higher level of comprehension and lower for a lower level of comprehension.
(e) software for evaluating said student's new level of comprehension during said review;
(f) software for re-sorting said concepts into said pools based on said new level of comprehension; and
(g) software for repeating steps (d), (e) and (f) until a desired level of comprehension is attained.

25. The Technology assisted learning system of claim 24 wherein said software for presenting a plurality of items to be learned displays examples of the item to be learned, provides a definition or explanation of the item to be learned, and provides activities wherein the student can develop an understanding of the item.

26. The technology assisted learning system of claim 24 wherein said evaluating said student's level of comprehension and said student's new level of comprehension are determined by said student's speed of response and correctness of response.

27. The technology assisted learning system of claim 24 wherein said evaluating said student's level of comprehension and said student's new level of comprehension are determined by said student's quantity of consecutive correct responses, quantity of correct responses in a given session, speed of first response to a question when answered correctly, and percent of correct responses in a current review session.

28. A data indexing system comprising:
at least one computer comprised of a display portion, a central processing unit (CPU) portion, an input portion, an output portion, and one or more memory portions;
said memory portion(s) comprising:
software for assembling a database composed of database elements;
software for identifying one or more learning concepts;
software for analyzing each of said database elements to determine whether it contains any of said learning concepts; and,
software for tagging each of said database elements for each of said learning concepts contained therein so that database elements can be identified and accessed by the concepts contained therein.

29. The system of claim 28 wherein said database elements are composed of words, phrases, sentences, or other language constructs.

30. The system of claim 28 wherein said database elements are composed of mathematical expressions.

31. The system of claim 28 wherein said learning concepts are grammar principles.

32. The system of claim 28 wherein said learning concepts are mathematical principles.

33. The system of claim 28 wherein said learning concepts are vocabulary words.

34. An information learning system comprising:
at least one computer comprised of a display portion, a central processing unit (CPU) portion, an input portion, an output portion, and one or more memory portions;
said memory portion(s) comprising:
software for dividing a block of information into individually meaningful parts;
software for removing from said individually meaningful parts designated punctuation, capitalization or other superfluous matter that would help disclose the original sequence of said block of information;
software for presenting to a user said individually meaningful parts in a sequence different from the original sequence of said block of information;
software for prompting the user to assemble said individually meaningful parts into said original sequence of said block of information;
software for determining if the student assembled said individually meaningful parts into said original sequence of said block of information;
software for further subdividing said individually meaningful parts if the student successfully assembles said parts into said original sequence and reprompting the user to assemble the parts into said original sequence of said block of information; and
software for partially combining said individually meaningful parts into said original sequence of said block of information if the user fails to assemble said individually meaningful parts into said original sequence and reprompting the user to assemble the parts into said original sequence of said block of information.

35. The information learning system of claim 34 wherein said block of information is a phrase or sentence in a language to be learned, and said prompting the user to assemble said individually meaningful parts into said original sequence is a native language translation of the block of information.

36. The information learning system of claim 34 wherein said sequence different from said original sequence of said block of information is an alphabetical sequence of said individually meaningful parts.

37. The information learning system of claim 34 wherein said software for further subdividing said individually meaningful parts adds distractor parts when said individually meaningful parts are divided into basic information elements that cannot be further subdivided while retaining meaning.

38. An information learning system comprising:
at least one computer comprised of a display portion, a central processing unit (CPU) portion, an input portion, an output portion, and one or more memory portions;
said memory portion(s) comprising:
software for prompting the student for an open-ended response to a question;
software for analyzing said response for correctness;
software for displaying the correct response wherein incorrect portions of the user's response are displayed as dashed lines with one or more of the correct characters displayed as hints and wherein correct portions of the user's response are displayed in their correct form;
software for permitting the student to make a subsequent response to provide the complete hinted word or words; and
software for displaying the correct response wherein incorrect portions of the user's response are displayed as dashed lines with one or more of the correct characters displayed as hints and wherein correct portions of the user's response are displayed in their correct form, repeating the response and display routine until the user is able to produce the phrase without any hint characters showing.

39. The information learning system of claim 38 wherein said question is a phrase or sentence in a language to be learned, and said prompting the user to provide the open-ended response is a language translation.

40. The information learning system of claim 38 wherein said one or more of the correct characters displayed as hints comprise the characters at the beginning of the correct response.

41. The information learning system of claim 38 wherein said one or more of the correct characters displayed as hints comprise all but one of the characters of the correct response.

42. An information learning system comprising:

at least one computer comprised of a display portion, a central processing unit (CPU) portion, an input portion, an output portion, and one or more memory portions;

said memory portion(s) comprising:

- software for creating and maintaining a database comprised of database elements which are linked to conceptual content examples;
- software for allowing input of a query of one or more parts representing a desired concept;
- software for searching said database for elements that represent each part of a given query and recording said elements in element lists corresponding to each query part;
- software for deleting from said element lists the elements that are not linked to a content example that is linked to other elements representing all other parts of the query;
- software for displaying said element lists to a user and for rejection of elements by allowing said user to manually reject elements which do not correspond to the desired concept;
- software for automatically eliminating from said element lists elements linked to a content example that is no longer linked to other elements representing all other parts of the query due to said rejection of elements;
- software for finding all remaining content examples that are linked to one remaining element in each element list;
- software for displaying said remaining content examples to the user and for manual rejection and creation of a final content example group by allowing the user to reject said remaining content examples which do not correspond to the desired concept; and,
- software for storing said final content example group for subsequent access according to the concept it represents.

* * * * *

UNITED STATES PATENT AND TRADEMARK OFFICE
CERTIFICATE OF CORRECTION

PATENT NO.   : 6,077,085
DATED        : June 20, 2000
INVENTOR(S)  : Kent Parry and C. Bret Elzinga It is certified that error appears in the above-identified patent and that said Letters Patent is hereby corrected as shown below:

<u>Title page,</u>
Item [56], References Cited, change "5,957,669" to -- 5,957,699 --

Item [57], ABSTRACT,
Line 26, change "students" to -- student's --

<u>Drawings,</u>
Figure 9, Reference 960, change "their" to -- the --, both instances.

<u>Column 1,</u>
Line 24, change "her" to -- his/her --
Line 56, change "her" to -- his/her --
Line 60, change "her" to -- his/her --

<u>Column 2,</u>
Line 16, change "allows" to -- allow --
Line 21, change "allows" to -- would allow --

<u>Column 3,</u>
Line 3, change "her" to -- his/her --

<u>Column 11,</u>
Line 18, change "or" to -- of --

<u>Column 12,</u>
Line 22, change "of" to -- or --
Line 26, change "her" to -- his/her --

<u>Column 25,</u>
Line 47, change "as" to -- a --

<u>Column 26,</u>
Line 20, change "her" to -- his/her --
Line 21, change "she" to -- he/she --

UNITED STATES PATENT AND TRADEMARK OFFICE
CERTIFICATE OF CORRECTION

PATENT NO. : 6,077,085
DATED : June 20, 2000
INVENTOR(S) : Kent Parry and C. Bret Elzinga It is certified that error appears in the above-identified patent and that said Letters Patent is hereby corrected as shown below:

<u>Column 31,</u>
Line 9, change "Technology" to -- technology --

Signed and Sealed this

Nineteenth Day of November, 2002

*Attest:*

*Attesting Officer*

JAMES E. ROGAN
*Director of the United States Patent and Trademark Office*